United States Patent
Watanabe

(10) Patent No.: US 9,216,671 B2
(45) Date of Patent: Dec. 22, 2015

(54) VEHICLE SEAT FLIP-UP MECHANISM AND VEHICLE SEAT

(75) Inventor: Masato Watanabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 73 days.

(21) Appl. No.: 14/008,633

(22) PCT Filed: Mar. 29, 2012

(86) PCT No.: PCT/JP2012/058420
§ 371 (c)(1),
(2), (4) Date: Oct. 17, 2013

(87) PCT Pub. No.: WO2012/133679
PCT Pub. Date: Oct. 4, 2012

(65) Prior Publication Data
US 2014/0049083 A1    Feb. 20, 2014

(30) Foreign Application Priority Data

Mar. 31, 2011  (JP) ................ 2011-081075
Mar. 31, 2011  (JP) ................ 2011-081076
Mar. 31, 2011  (JP) ................ 2011-081077
Mar. 31, 2011  (JP) ................ 2011-081079

(51) Int. Cl.
*B60N 2/02*    (2006.01)
*B60N 2/30*    (2006.01)
(Continued)

(52) U.S. Cl.
CPC ............. *B60N 2/304* (2013.01); *B60N 2/309* (2013.01); *B60N 2/3013* (2013.01); *B60N 2/3065* (2013.01); *B60N 2/366* (2013.01); *B60N 2/4858* (2013.01)

(58) Field of Classification Search
CPC .... B60N 2/3038; B60N 2/304; B60N 2/3045; B60N 2/305; B60N 2/4858; B60N 2/366; B60N 2/3013; B60N 2/3065; B60N 2/309
See application file for complete search history.

(56) References Cited

U.S. PATENT DOCUMENTS 5,662,368 A * 9/1997 Ito et al. ............... 296/65.05
5,772,283 A * 6/1998 Yoshida et al. ......... 297/452.38
(Continued)

FOREIGN PATENT DOCUMENTS

GB      2 141 326 A    12/1984
JP      09-164870 A     6/1997
(Continued)

OTHER PUBLICATIONS

Extended European Search Report issued for EP 12764179.3 (Aug. 12, 2014).
(Continued)

*Primary Examiner* — Philip Gabler
(74) *Attorney, Agent, or Firm* — Drinker Biddle & Reath LLP

(57) ABSTRACT

Provided is a vehicle seat flip-up mechanism that may be stably fixed to a vehicle body floor and may stably support an occupant load. In a vehicle seat flip-up mechanism that is provided to switch a posture of a seat cushion between a normal sitting posture and a stowed posture where the seat cushion is stowed while being inclined forward, the vehicle seat flip-up mechanism includes: links that extend in the front to back direction while being separated from each other in the seat width direction; a mounting bracket that is attached to the ends of the links and supports a seat cushion; a connection member that is installed in the mounting bracket; a support mechanism that rotatably supports the links; and mounting plates that are disposed below the support mechanism and are locked to the vehicle body floor, in which the mounting plate extends rearward relative to the link.

17 Claims, 27 Drawing Sheets

(51) Int. Cl.
  *B60N 2/36* (2006.01)
  *B60N 2/48* (2006.01)

(56) References Cited

U.S. PATENT DOCUMENTS

| | | | |
|---|---|---|---|
| 6,155,639 A * | 12/2000 | Frolo | ............................ 297/331 |
| 6,293,603 B1 | 9/2001 | Waku et al. | |
| 7,588,282 B2 * | 9/2009 | Kolena et al. | .............. 296/65.09 |
| 2005/0116493 A1 * | 6/2005 | Falchero et al. | ........... 296/65.09 |
| 2007/0187972 A1 | 8/2007 | Takatsura et al. | |
| 2009/0102223 A1 | 4/2009 | Kuroki et al. | |
| 2010/0295353 A1 * | 11/2010 | Tame | ............................ 297/340 |
| 2011/0148163 A1 | 6/2011 | Mather et al. | |

FOREIGN PATENT DOCUMENTS

| | | | |
|---|---|---|---|
| JP | 2005-212642 | A | 8/2005 |
| JP | 4468310 | B2 | 5/2010 |
| JP | 2011-011665 | A | 1/2011 |

OTHER PUBLICATIONS

Office Action issued by the State Intellectual Property Office of China in related application CN201280014704.3, May 12, 2015, 16 pages (with English translation).

* cited by examiner

VEHICLE SEAT FLIP-UP MECHANISM AND VEHICLE SEAT

CROSS REFERENCE TO RELATED APPLICATIONS

This application is the U.S. national phase of the International Patent Application No. PCT/JP2012/058420, filed Mar. 29, 2012, which claims the benefit of the following Japanese Patent Applications: Application No. 2011-081075, filed Mar. 31, 2011, Application No. 2011-081076, filed Mar. 31, 2011, Application No. 2011-081077, filed Mar. 31, 2011, and Application No. 2011-081079, filed Mar. 31, 2011, the entire content of all being incorporated herein by reference.

BACKGROUND

Disclosed herein is a vehicle seat flip-up mechanism and a vehicle seat with the vehicle seat flip-up mechanism, and particularly, a vehicle seat flip-up mechanism that may be stably fixed to a vehicle body floor and may stably stow a vehicle seat in a rotating manner, and a vehicle seat that includes the vehicle seat flip-up mechanism.

There is known a vehicle seat including a seat cushion which moves between a sitting position and a stowed position and a seat cushion driving mechanism which performs an operation (hereinafter, referred to as a seat cushion moving operation) for moving the seat cushion from the sitting position toward the stowed position. The cushion driving mechanism as a component of the vehicle seat is equipped with a movable member that is movable during the seat cushion moving operation (for example, see Japanese Patent Document 2011-11665 A 1 ("the '665 Document")). The vehicle seat disclosed in the '665 Document is equipped with a support arm which is a movable member rotatably supported while the seat cushion is fixed to one end of the support arm.

Hitherto, as an example of the vehicle seat, a vehicle seat is known which may be stowed during non-use by inclining a seatback and flipping up a seat cushion. For example, Japanese Patent Document No. 4468310 B1 ("the '310 Document") discloses a vehicle seat which may be stowed in a rotated state by inclining a seatback forward and flipping up a seat cushion forward.

In a double folding mechanism of the vehicle seat of the '310 Document, the seat cushion is mounted on a floor of a vehicle interior through a connection structure with a rotation mechanism. Then, in a case where the seat cushion is stowed, the seat cushion is rotated forward by the rotation mechanism with a pair of rotation members disposed while being separated from each other in the right and left direction and is held at a predetermined position.

In the connection structure, the pair of rotation members is connected by a connection shaft installed at the upper ends (that is, the ends mounted with the seat cushion). Then, each rotation member is biased by a spring member provided at the lower end of the rotation member, and when a locking state is canceled, the rotation member rotates by the biasing force of the spring member so that the seat cushion may be stowed.

In this way, in the vehicle seat which is stowed in a rotated state by flipping up the seat cushion, the rotation member is mounted on the seat cushion. In a case where the seat cushion is stowed, when the locking of the seat cushion is canceled, the seat cushion is flipped up to a stowed posture (a flip-up position) by the rotation mechanism. In a case where the seat cushion is returned to the sitting posture, an occupant rotates the seat cushion to a sitting position and fixes the position (the state) of the seat cushion by a lock mechanism so that the seat cushion may be disposed at the sitting position.

The connection structure of the double folding mechanism disclosed in the '310 Document is equipped with a plate-shaped fixing member that is fixed to a vehicle interior floor. Then, as the fixing member, a pair of fixing members having different shapes are installed in the seat width direction (the right and left direction), and a reinforcing member is installed in the fixing members. Accordingly, the connection structure is fixed to the vehicle interior floor through the plate-shaped fixing member that is substantially formed in an L-shape in the plan view.

In the vehicle seat which is stowed in a rotated state by flipping up the seat cushion, an elongated rotation member supporting the seat cushion in a rotatable manner is disposed along the front to back direction of the seat. Then, the rotation member needs to be formed with a predetermined length or more in order to flip up the seat cushion to the stowed posture (the flip-up position).

In the connection structure of the double folding mechanism disclosed in the '310 Document, the rotation member is formed to be longer than the fixing member. That is, when the seat cushion is held at the sitting posture, the rotation member protrudes rearward relative to the fixing member in the plan view.

As in the '310 Document, in the connection structure in which the fixing members are formed to not be symmetrical to each other in the right and left direction and the rotation member is formed in a large size, a problem arises that it is difficult to uniformly distribute a load applied to the seat cushion. Accordingly, the entire connection structure is easily inclined toward a position without the fixing member, and hence a problem arises that it is difficult to stably support the load of the occupant.

Further, in the connection structure of the double folding mechanism disclosed in the '310 Document, in a case where the seat cushion rotates, the rotation range of the seat cushion is defined by the rotation member. However, when the seat cushion does not stably rotate, an undesirable situation occurs in which the seat cushion is rotated to a non-locking position and hence may not be returned to the sitting posture or an undesirable situation occurs in which the seat cushion may not be rotated to an appropriate stowed posture. Accordingly, a technique has been demanded which may stably rotate the seat cushion and may stably hold the seat cushion in the sitting posture and the stowed posture at all times.

Further, in the double folding mechanism of the '310 Document, since plural components overlap one another in the seat width direction and the up to down direction in the seat cushion mounting structure, a problem arises that the size increase of the vehicle seat is facilitated.

Furthermore, when the seat cushion is located at the sitting position, the rotation member is located below the seat cushion and is covered by the seat cushion. However, when a part of the rotation member is exposed to the outside even while the rotation member is covered by the seat cushion, there is a concern that foreign substances such as trash or dust may adhere to the exposed portion. Further, when the seat cushion moves to the stowed position, the state of the rotation member changes from the state where the rotation member is covered by the seat cushion to the state where the rotation member is exposed to the outside. Thus, in such an exposed state, the foreign substance adhering phenomenon noticeably occurs.

SUMMARY

It is an object of various embodiments of the present invention to provide a vehicle seat flip-up mechanism that may be stably fixed to a vehicle body floor and may stably support a load of an occupant.

Further, it is another object to provide a vehicle seat flip-up mechanism that may stably rotate a seat cushion to a sitting posture or a stowed posture.

Moreover, it is still another object to provide a vehicle seat flip-up mechanism that saves an installation space without a size increase.

Further, it is still a further object to provide a vehicle seat that includes the above-described flip-up mechanism and may suppress foreign substances from adhering to the flip-up mechanism.

According to an embodiment of the present invention, the above-described problems are solved by a vehicle seat flip-up mechanism that is provided to switch a posture of a seat cushion between a normal sitting posture and a stowed posture where the seat cushion is stowed while being inclined forward, the vehicle seat flip-up mechanism including: a pair of links that is formed by elongated bodies extending in the front to back direction while being separated from each other in the seat width direction; a pair of mounting brackets that is attached to the ends of the pair of links and supports the seat cushion; a connection member that is installed in the pair of mounting brackets; a pair of support mechanisms that rotatably supports the pair of links; and a mounting plate that is disposed below the pair of support mechanisms and is locked to a vehicle body floor, in which the mounting plate extends rearward relative to the links.

In this way, in the vehicle seat flip-up mechanism in which the seat cushion may be switched between the sitting posture and the stowed posture, the mounting plate attached to the vehicle body floor extends rearward relative to the link for rotating the seat cushion. With this configuration, since the mounting plate is longer than the link in the rearward direction, a base portion for fixing the respective components to the vehicle body floor is formed in a large size. Accordingly, when the occupant sits on the vehicle seat, the load applied to the seat cushion may be easily transmitted to the vehicle body floor in a distributed state. As a result, the seat cushion may stably support the load of the occupant.

Further, with the above-described configuration, since the flip-up mechanism fixed to the vehicle body floor may transmit the load to the vehicle body floor in a distributed state, it is possible to suppress a problem in which the load of the flip-up mechanism is biased in one direction so that the flip-up mechanism is inclined. Accordingly, the vehicle seat flip-up mechanism may be stably fixed to the vehicle body floor.

Further, as in an embodiment, the mounting plate may include a fixing member that extends in the seat width direction and a mounting member that overlaps one end of the fixing member and is disposed along the extension direction of the link, the mounting member may include a mounting surface portion that overlaps one end of the fixing member and contacts the vehicle body floor, and an intersection point in the top view between the connection member and an imaginary line connecting an apex at the inside of a rear end of the mounting surface portion in the seat width direction and an apex not overlapping the mounting member in a rear end of the fixing member may be disposed nearer the other end of the fixing member compared to a center portion of the connection member in the extension direction.

In this way, in the vehicle seat flip-up mechanism, the center portion of the connection member in the extension direction is close to the mounting member relative to the intersection point in the top view between the connection member and the imaginary line passing through predetermined points of the mounting member and the fixing member. The center portion of the connection member is the center point of the pair of mounting brackets supporting the seat cushion, and is a point to which the load (including the sitting load of the occupant) from the seat cushion is most easily applied. The intersection point between the imaginary line and the connection member is the center position of the component constituting the flip-up mechanism, and is located at a position where the flip-up member is inclined rearward. Accordingly, since the center point of the mounting bracket is disposed nearer the mounting member compared to the center portion of the component constituting the flip-up mechanism, the seat cushion may easily support the load of the occupant. Further, the load applied to the center portion of the connection member suppresses the rearward inclination of the component constituting the flip-up mechanism. As a result, it is possible to further suppress the vehicle seat flip-up mechanism from being inclined rearward.

Moreover, as in an embodiment, one end of the mounting member may be disposed while being trapped between the fixing member and the vehicle body floor.

In this way, since one end of the mounting member is disposed while being trapped between the fixing member and the vehicle body floor, when a load of inclining the flip-up mechanism rearward is generated, one end of the mounting member is pressed by the fixing member downward from the upside, so that the inclination of the vehicle seat flip-up mechanism is suppressed.

Moreover, as in an embodiment, at least one of the pair of support mechanisms may include a spiral spring that is attached onto the fixing member and biases the link, and a portion overlapping the fixing member in the mounting member may be disposed at the outside in the seat width direction relative to the attachment position of the spiral spring.

In this way, the mounting member is formed to not overlap the spiral spring biasing the link in the height direction. Accordingly, since plural components are disposed to not overlap one another in the height direction, an increase in the size of the vehicle seat flip-up mechanism in the height direction may be suppressed.

Further, as in an embodiment, the vehicle seat flip-up mechanism may preferably include a guide member that is formed by an elongated body attached to at least one of the pair of mounting brackets and disposed in parallel to the link.

In this way, in the vehicle seat flip-up mechanism in which the seat cushion may be switched between the sitting posture and the stowed posture, the connection member is installed in the mounting bracket supporting the seat cushion. Accordingly, since the connection member is provided, it is possible to improve the rigidity of the mounting bracket to which the load of the occupant is easily applied. Further, since the mounting bracket is attached to the end of the link, the rigidity of the link may be also improved by the connection member.

Accordingly, since the connection member is installed between the mounting bracket and the link, the rigidity of the mounting bracket and the link is improved, and hence the link may be stably rotated.

Moreover, since the guide member that is disposed along the extension direction of the link is attached to at least one mounting bracket, the link may be reinforced by the guide member. Then, the guide member is mounted on the mounting bracket of which the rigidity is improved by the connection member as described above. Accordingly, since the guide member is attached to the mounting bracket with high rigidity, the link may be further stably rotated.

Further, as in an embodiment, when the seat cushion is held at the stowed posture, the end attached to the mounting bracket in the guide member may be disposed at the lower side relative to the connection member.

In this way, when the seat cushion is held at the stowed posture, the end (the end attached to the mounting bracket) of the guide member is disposed below the connection member installed to the mounting bracket. Accordingly, even when the guide member is disposed along the link, it is preferable that the size of the seat cushion does not increase in the height direction while the seat cushion is stowed.

Further, as in an embodiment, the mounting bracket may include a seat cushion mounting surface portion to which the seat cushion is attached and a side surface flange portion which is formed to be bent from the seat cushion mounting surface portion. Then, the end of the connection member and the end of the guide member may be attached to the side surface flange portion and a concave portion may be provided between a portion to which the end of the connection member is attached and a portion to which the end of the guide member is attached.

In this way, the mounting bracket includes the seat cushion mounting surface portion to which the seat cushion is attached and the side surface flange portion to which the ends of the guide member and the connection member are attached. In this way, since the mounting bracket to which the seat cushion is fixed is partly bent and the connection member and the guide member are fixed to the bent portion, it is possible to suppress an increase in the size of the configuration in which the connection member and the guide member are attached to the mounting bracket.

Further, since a part of the side surface flange portion is formed by a notched concave portion, the area of the side surface flange portion may be minimized. That is, since the portion without the connection member and the guide member in the side surface flange portion is cut, the mounting bracket may be decreased in weight.

Further, as in an embodiment, a rotation shaft may be provided at a lower end of the link, and the mounting bracket may be attached to an upper end of the link and may have a striker fixed thereto to regulate the flip-up operation of the seat cushion.

In this way, since the striker for regulating the flip-up operation of the seat cushion is fixed to the mounting bracket and the mounting bracket is attached to the upper end (the end opposite to the end provided with the rotation shaft of the link) of the link, the rotation of the link at the end of the link is regulated. Accordingly, for example, compared to the case where the striker is provided at the intermediate portion of the link, the load (stress) applied to the link and the striker decreases when the striker is fixed to the upper end of the link as described above. As a result, there is no need to increase the sizes of the striker and the striker lock in order to satisfy the strength necessary for regulating the rotation of the link. Accordingly, it is preferable that the size of the striker lock mechanism for regulating the flip-up operation of the seat cushion does not increase.

Further, as in an embodiment, the link and the guide member may be attached to a part opposite to the attachment surface for the striker in the mounting bracket and may be disposed at the inside in the seat width direction.

In this way, the striker is mounted on the link and the guide member through the mounting bracket, and the link and the guide member are disposed at the inside relative to the striker. Accordingly, it is preferable that the width between the links provided as a pair and the width of the guide member do not increase compared to the case where the striker is disposed between the guide member and the links provided as a pair.

Further, as in an embodiment, the striker may include a hook portion which is bent in the horizontal direction, and the hook portion may be disposed between the end of the link attached to the mounting bracket and the end of the guide member attached to the mounting bracket.

In this way, when the hook portion of the striker is disposed between the end of the link attached to the mounting bracket and the end of the guide member, the load of the occupant may be stably received. The hook portion of the striker is a portion which engages with the striker lock, and is a portion which is pressed downward to support the seat cushion when the occupant sits on the vehicle seat. Accordingly, since the portion as the support point for supporting the seat cushion is present between the end of the link and the end of the guide member, it is possible to improve the stability when the occupant sits on the vehicle seat.

Further, as in an embodiment, the pair of mounting brackets may be attached to the upper ends of the pair of links to support the seat cushion, and the pair of links may be formed so that a distance between the upper ends is larger than a distance between the lower ends.

In this way, since the distance between the upper ends of the links is set to be larger than the distance between the lower ends thereof, the seat cushion is stably supported by the links. Accordingly, since the seat cushion is stably attached to the link, the seat cushion may be stably rotated.

Further, since the distance between the lower ends of the links is small, the portion mounted on the vehicle body floor in the flip-up mechanism becomes smaller than the portion supporting the seat cushion in the flip-up mechanism. As a result, it is preferable that the size of the portion fixed to the vehicle body floor in the vehicle seat flip-up mechanism does not increase.

Further, as in an embodiment, an intermediate portion of the link in the longitudinal direction may be provided with a bent portion which widens the distance between the upper ends of the pair of links, the vehicle seat may further include a headrest, and the pair of links may be formed so that a distance between the upper ends is larger than a width of the headrest and a distance from the lower end to the bent portion is larger than a thickness of the headrest.

In this way, since the link includes the bent portion, the rigidity of the link is improved, and hence the link may be stably rotated. Further, since the distance between the upper ends of the links may be increased by a simple configuration in which a part of the link is bent, a manufacturing process does not become complex.

Further, since the distance between the links disposed while being separated from each other is set to be larger than the width of the headrest and the distance from the lower end of the link to the bent portion thereof is set to be larger than the thickness of the headrest, the headrest may be stowed between the links when the vehicle seat is stowed (that is, when the seat cushion is in the flip-up state). Then, since the vehicle seat may be stowed so that the height direction of the headrest follows the extension direction of the bottom surface of the seat cushion, the vehicle seat may be stowed in a compact size.

Further, as in an embodiment, the mounting plate may include a fixing member that is fixed to the vehicle body floor and extends in the seat width direction, and a reinforcement collar may be integrally formed with the outside of the lower end of the link in the seat width direction and a base bracket fixed to the fixing member may be attached to the outside of the reinforcement collar in the seat width direction.

In this way, in the vehicle seat flip-up mechanism, the reinforcement collar may be integrally formed in the vicinity of the rotation shaft to which the maximum load is easily applied in the link. With the above-described configuration, the rigidity of the link may be improved. Further, since the link is fixed to the fixing member (the vehicle body floor) by mounting the base bracket on the portion provided with the reinforcement collar, the link may be strongly mounted on the fixing member. Accordingly, since the link is fixed to the fixing member (the vehicle body floor) without collapsing, the link may be stably rotated.

Further, as in an embodiment, the vehicle seat flip-up mechanism may further include a guide member that is formed by an elongated body attached to at least one of the pair of mounting brackets and is substantially disposed in parallel to the link, the base bracket may include a fixing portion fixed to the fixing member and an upright wall portion bent from the fixing portion, and the guide member may be disposed at the inside of the upright wall portion in the seat width direction.

In this way, since the guide member is provided to be disposed along the link, the link may be further stably rotated. Then, since the guide member is attached to the inside of the base bracket, the guide member may be protected from the external force applied from the outside in the seat width direction. Further, since the guide member is disposed at the inside of the base bracket, it is preferable that the size of the vehicle seat flip-up mechanism does not increase.

Further, as in an embodiment, it is preferable to provide a vehicle seat including: the vehicle seat flip-up mechanism according to any embodiment described above, and a cover member that covers the flip-up mechanism.

In this way, since the flip-up mechanism is covered by the cover member, it is possible to suppress the foreign substances from adhering to the flip-up mechanism.

Further, as in an embodiment, a stowed position in which the seat cushion is held in the stowed posture may be located at the front side relative to a sitting position in which the seat cushion is held at the sitting posture, the flip-up mechanism may include a biasing member that biases the link and may perform an operation of rotating the link forward by a biasing force of the biasing member as an operation of moving the seat cushion from the sitting position toward the stowed position, and the cover member may include a biasing member cover portion that covers the biasing member.

In this way, since particularly the biasing member among the components constituting the flip-up mechanism is covered by the biasing member cover portion, it is possible to suppress the foreign substances from adhering to the biasing member.

Further, as in an embodiment, the biasing member cover portion may be mounted to be rotatable forward along with the forward rotation of the link.

In this way, since the biasing member cover portion follows the forward rotation of the link, the biasing member cover portion does not disturb the forward rotation of the link.

Further, as in an embodiment, the vehicle seat may further include a biasing spring that biases the biasing member cover portion, in which the link may contact the biasing member cover portion during the forward rotation, in which, when a forward direction is set as a first direction and a rearward direction is set as a second direction in the rotation direction of the biasing member cover portion, the biasing spring may bias the biasing member cover portion in the second direction, and in which, when the link further rotates forward while contacting the biasing member cover portion, the link may press the biasing member cover portion in the first direction to rotate the biasing member cover portion forward against a biasing force of the biasing spring.

In this way, since the link further rotates forward while contacting the biasing member cover portion and presses the biasing member cover portion to rotate the biasing member cover portion forward against the biasing force of the biasing spring, it is possible to improve the following ability of the biasing member cover portion with respect to the forward rotation of the link. Further, since the biasing member cover portion is automatically inclined by the forward rotation of the link and is automatically returned to the original position when the pressing operation using the link is canceled, the operability of the biasing member cover portion becomes satisfactory.

According to various embodiments, since the mounting plate fixed to the vehicle body floor is longer than the link rotating the seat cushion in the rearward direction, the rearward inclination of the vehicle seat flip-up mechanism may be suppressed. Accordingly, the vehicle seat flip-up mechanism is stably fixed to the vehicle body floor. Further, since the load from the seat cushion may be transmitted to the vehicle body floor in a distributed state, the load of the occupant may be stably supported.

According to various embodiments, since the intermediate portion of the connection bar to which the load of the occupant is easily applied is disposed in the vicinity of the mounting member, it is possible to provide the vehicle seat flip-up mechanism which easily supports the load of the occupant and is not easily inclined.

According to various embodiments, when the load of inclining the flip-up mechanism rearward is applied, the mounting member is pressed by the fixing member toward the vehicle body floor from the upside, and hence the inclination of the vehicle seat flip-up mechanism may be suppressed.

According to various embodiments, since plural components do not overlap one another at the attachment position of the spiral spring for biasing the link, an increase in the size of the vehicle seat flip-up mechanism may be suppressed.

According to various embodiments, since the mounting bracket supporting the seat cushion is connected by the connection member, the rigidity of the mounting bracket is improved. Then, since the guide member disposed in the extension direction of the link is attached to the mounting bracket of which the rigidity is improved, the link may be reinforced. In this way, since the rigidity of the mounting bracket is improved and the guide member is further provided, the link may be stably rotated. As a result, it is possible to stably rotate the seat cushion to the sitting posture or the stowed posture.

According to various embodiments, it is possible to provide the vehicle seat flip-up mechanism that largely saves an installation space without a size increase even when the guide member is provided.

According to various embodiments, it is possible to suppress an increase in the size of the mounting bracket to which the connection member and the guide member are attached. Further, since the concave portion is formed in the side surface flange portion of the mounting bracket, the mounting bracket may be decreased in weight.

According to various embodiments, since the striker is attached to the portion close to the end of the link, the load (stress) applied to the striker may be decreased. Accordingly, without a size increase of the striker and the striker lock, the strength necessary for regulating the rotation of the seat cushion may be ensured.

According to various embodiments, since the link and the guide member are provided at the inside of the striker in the seat width direction, an increase in the size of the entire flip-up mechanism of the seat cushion may be suppressed.

According to various embodiments, since the hook portion of the striker is disposed between the end of the link and the end of the guide member, the load generated when the occupant sits on the vehicle seat may be stably received.

According to various embodiments, since the distance between the upper ends of the links is larger than the distance between the lower ends thereof, the seat cushion is stably supported. As a result, the link stably rotates without collapsing, and hence the seat cushion may be stably rotated to the sitting posture or the stowed posture. Further, since the distance between the lower ends of the links is small, the flip-up mechanism is installed in the vehicle body floor in a compact size.

According to various embodiments, since the rigidity of the link is improved by providing the bent portion, the link may be stably rotated. Further, since the rigidity of the link may be improved just by bending a part of the link, the manufacturing process does not become complex. Since the headrest may be stowed in a stowing space between the links, the vehicle seat may be stowed in a compact size.

According to various embodiments, since the reinforcement collar is integrally formed with the link, it is possible to reinforce the portion of the rotation shaft to which the maximum load is easily applied in the link. Then, since the link is strongly fixed to the fixing member (the vehicle body floor) by fixing the portion provided with the reinforcement collar to the fixing member, the link may be stably rotated.

According to various embodiments, since the guide member is provided, the link may be stably rotated. Further, since the guide member is attached to the inside of the base bracket, the guide member may be protected from the external force applied from the outside in the seat width direction and an increase in the size thereof in the seat width direction may be suppressed.

According to various embodiments, since the cover member that covers the flip-up mechanism is provided, it is possible to suppress the foreign substances from adhering to the flip-up mechanism.

According to various embodiments, since particularly the biasing member among the components constituting the flip-up mechanism is covered by the biasing member cover portion, it is possible to suppress the foreign substances from adhering to the biasing member.

According to various embodiments, since the biasing member cover portion follows the forward rotation of the link, the biasing member cover portion does not disturb the forward rotation of the link.

According to various embodiments, when the link rotates forward, the link presses the biasing member cover portion forward so that the biasing member cover portion rotates, and hence the following ability of the biasing member cover portion with respect to the forward rotation of the link is improved. Further, since the biasing member cover portion is inclined by the forward rotation of the link and is returned to the original position when the pressing operation using the link is canceled, the operability becomes satisfactory.

BRIEF DESCRIPTION OF THE DRAWINGS

The following drawings illustrate various embodiments of the invention.

DETAILED DESCRIPTION

Hereinafter, an embodiment (hereinafter, this embodiment) according to the present invention will be described by referring to FIGS. 1 to 27. Furthermore, the embodiment to be described later is used to help the understanding, and does not limit the present invention. The present invention may be modified and improved without departing from the spirit thereof, and the present invention includes the equivalent thereof. Further, the material or the shape to be described later is merely an example of exhibiting the effect of the present invention, and does not limit the present invention.

Figure 7:
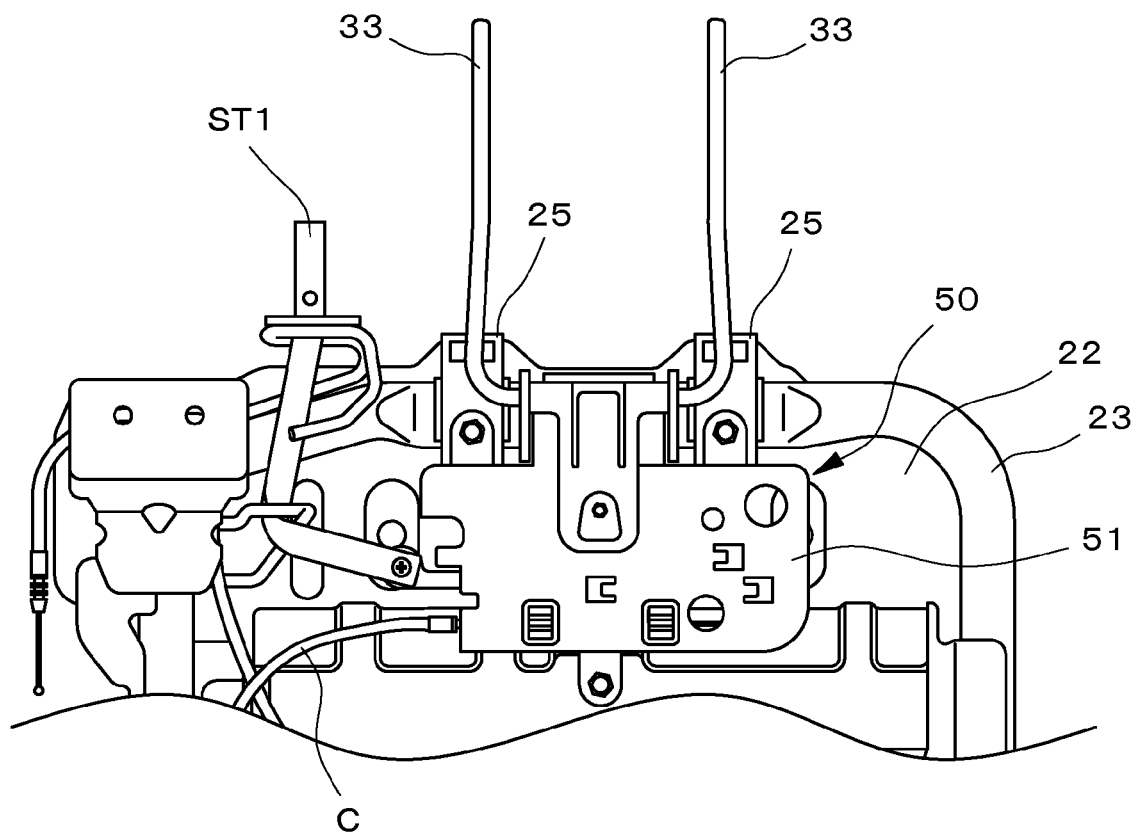
FIG. 7 is a front view diagram of a headrest rotation mechanism 50 viewed from the front side.
Figure 8:
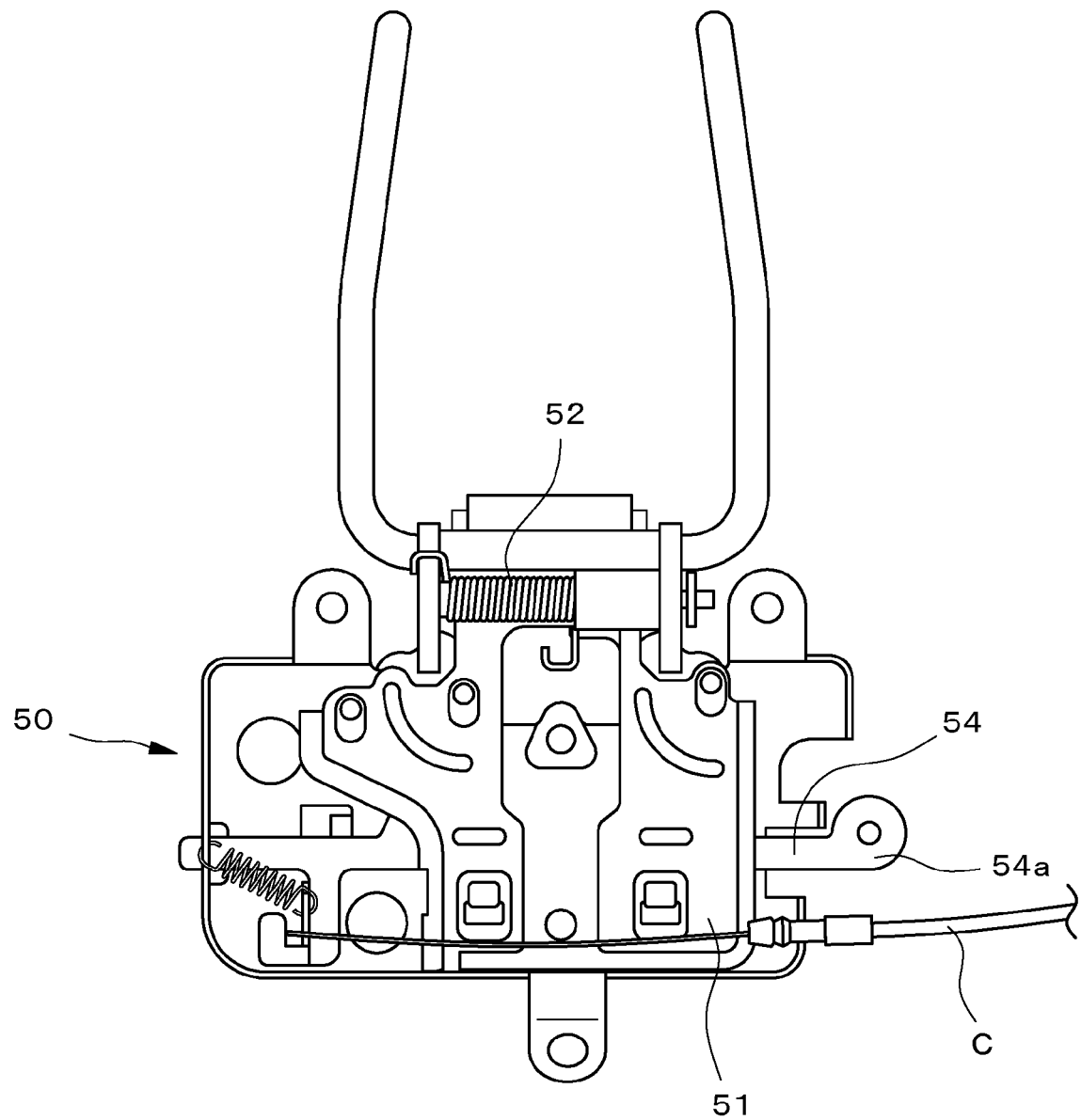
FIG. 8 is a rear view diagram of the headrest rotation mechanism 50 viewed from the rear side.
Figure 9:
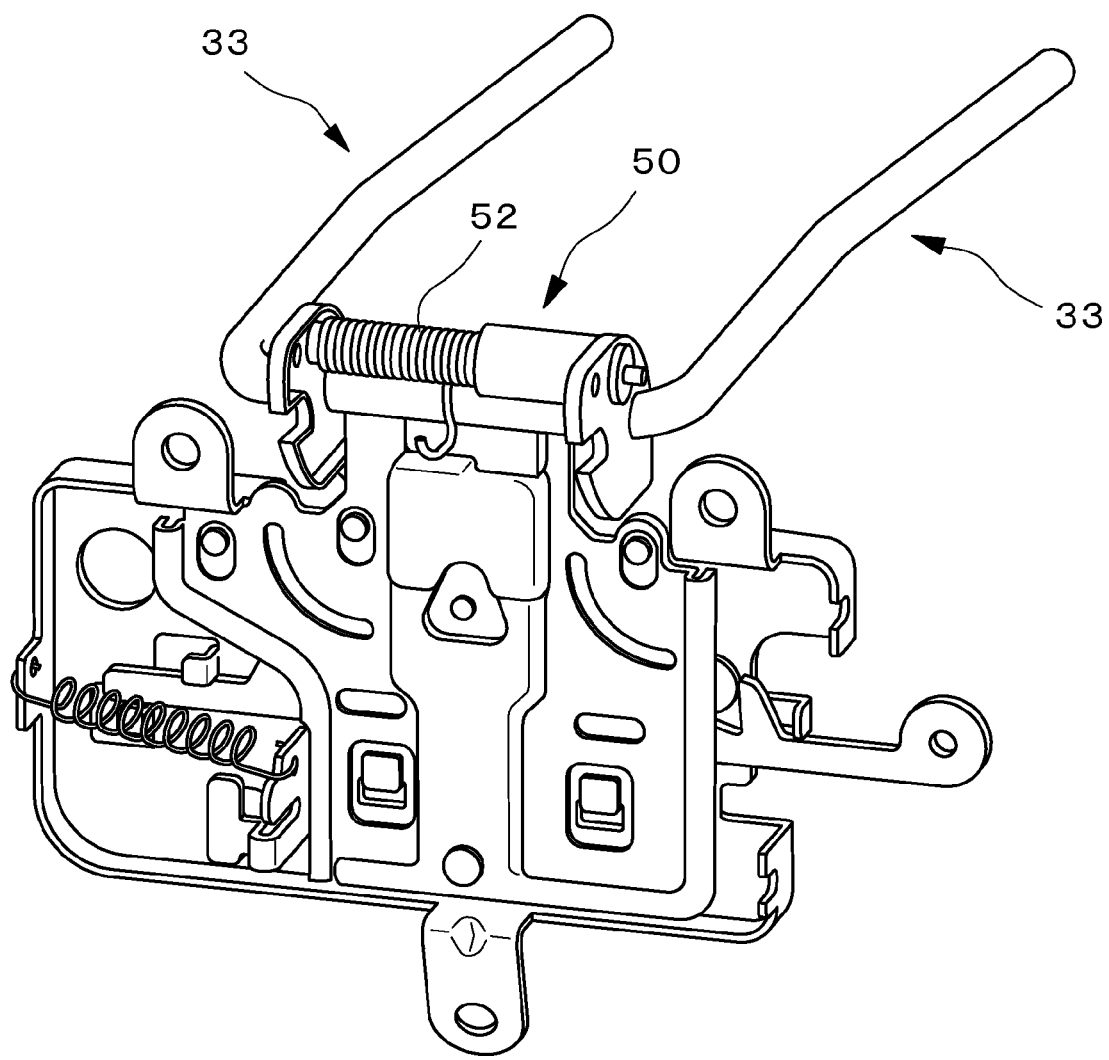
FIG. 9 is a rear perspective view illustrating the headrest rotation mechanism 50.

FIGS. 1 to 16 illustrate a vehicle seat (hereinafter, a vehicle seat S1) according to a first embodiment. FIGS. 7 to 9 are diagrams illustrating a headrest rotation mechanism 50.

FIGS. 23 to 27 are explanatory diagrams illustrating a cover member of the present invention.

Furthermore, the reference FR of the drawing indicates the front side of the vehicle, the reference RR indicates the rear side of the vehicle, and the reference UP indicates the upside/top side of the vehicle. Further, in the description below, the right and left direction indicates the right and left direction when the vehicle faces the front side and indicates a direction matching the width direction of the seat back frame 21, described later.

Figure 1:
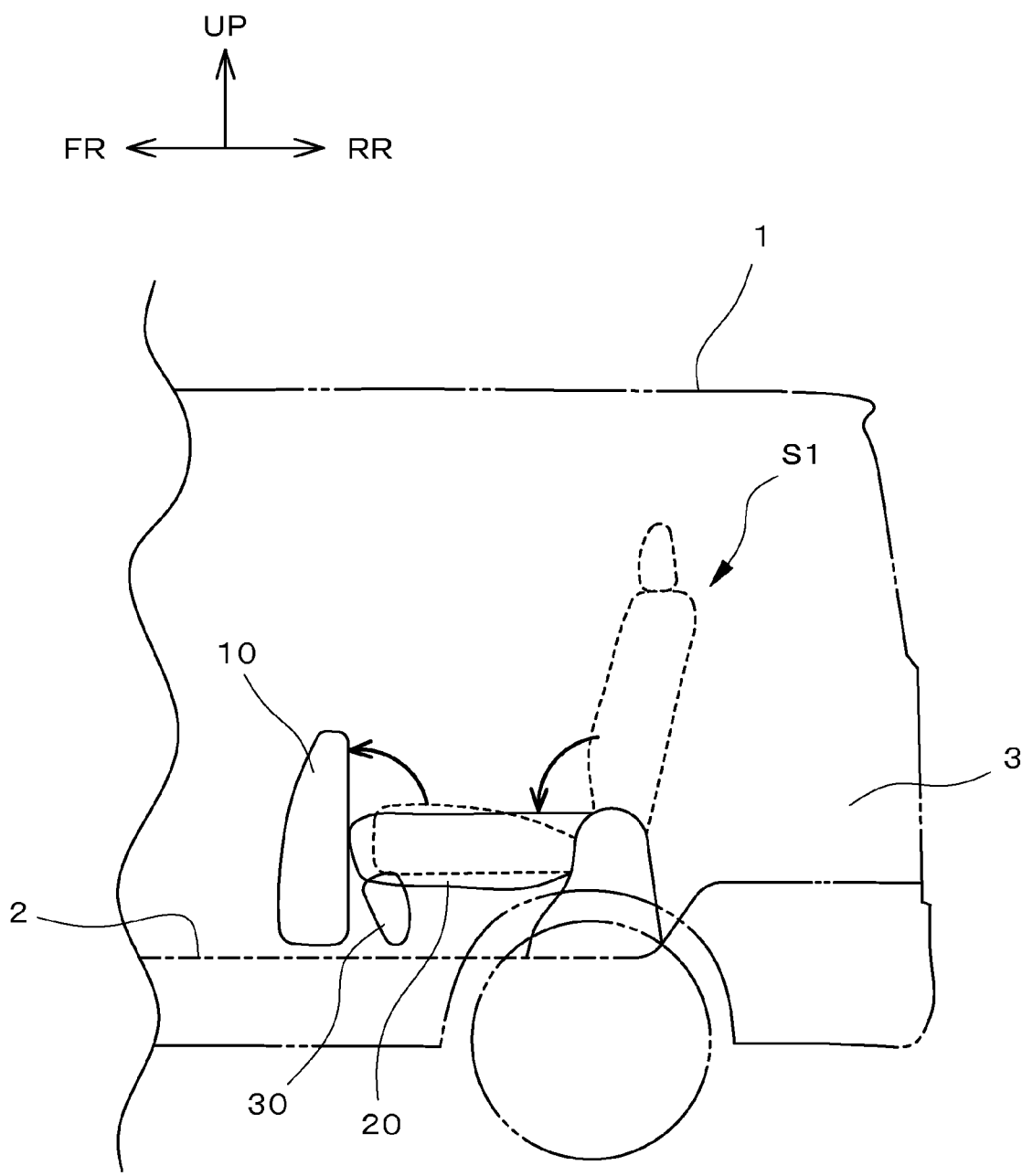
FIG. 1 is a schematic side view illustrating a rear part of a vehicle equipped with a vehicle seat S1.
Figure 2:
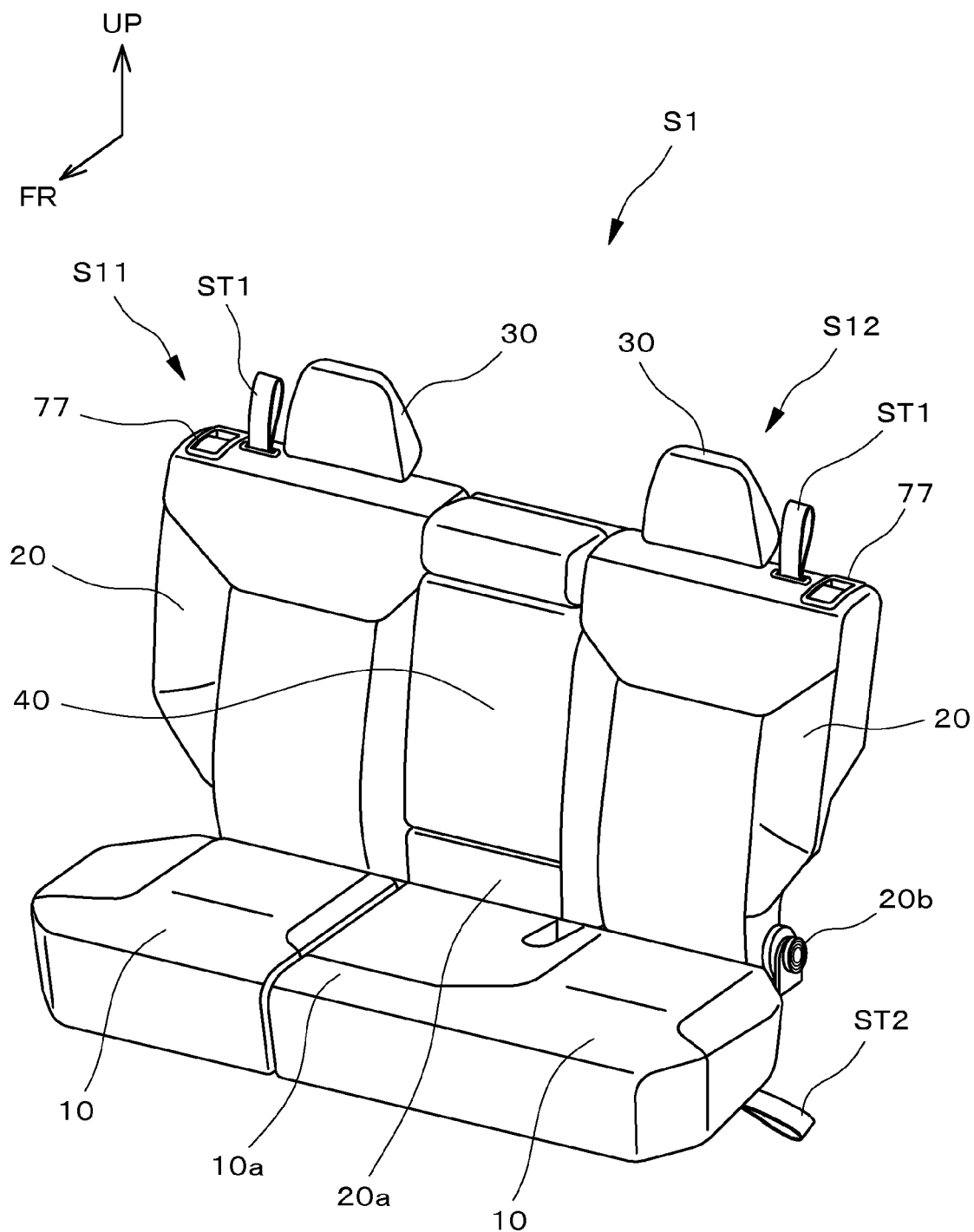
FIG. 2 is a front perspective view illustrating the vehicle seat S1.

As illustrated in FIG. 1, the vehicle seat S1 is an example of a conveyance seat, and is mounted as a rear seat on the vehicle which has a luggage compartment space at a rear part of a vehicle body of an automobile. Particularly, in this embodiment, the vehicle seat is mounted on a wagon type automobile.

Regarding the configuration of the vehicle seat S1, in this embodiment, the vehicle seat is divided into a right (passenger side) vehicle seat S11 and a left (driver side) vehicle seat S12, and each of the vehicle seats S11 and S12 includes a seat cushion 10, a seatback 20, and a headrest 30. Furthermore, an armrest 40 is disposed between the seatbacks 20 of the respective vehicle seats S11 and S12. In the left vehicle seat S12, the seatback 20 is integrated with a pedestal portion 20*a* located below the armrest 40 in FIG. 2, and the seat cushion 10 is integrated with a projection portion 10*a* disposed at the lower position of the pedestal portion 20*a* in FIG. 2. The right vehicle seat S11 and the left vehicle seat S12 are different from each other in the above-described points, but both vehicle seats S11 and S12 have the same basic configurations. For this reason, in the description below, only the configuration of the right vehicle seat S11 will be described as an example.

The vehicle seat S1 may switch its posture from a normal (or sitting) posture (which is a posture indicated by the dashed line in FIG. 1) in which a passenger may sit on the vehicle seat to a stowed posture (which is a posture indicated by the solid line in FIG. 1) where the seat is stowed to form a luggage compartment part 3 during non-use. That is, the seat cushion 10 is flipped up toward the front side of the vehicle when the posture of the vehicle seat S1 is switched to the stowed posture. Further, along with the flip-up of the seat cushion 10, the seatback 20 rotates forward to be inclined to a position where the seat cushion 10 before the flip-up is disposed on the vehicle body floor 2. Further, when the headrest 30 rotates forward by about 90° from a state where the headrest is disposed above the seatback 20 in the substantially vertical direction so that the seatback 20 is inclined onto the vehicle body floor 2, the headrest is stowed between the seat cushion 10 that is flipped up forward and the inclined seatback 20.

By the above-described series of operations, the vehicle seat S1 is stowed in a compact posture. Then, in the vehicle 1 which employs the vehicle seat S1 with the above-described configuration as the rear seat, the luggage compartment part 3 which constitutes a part of the vehicle body floor 2 is formed at the rear side of the vehicle seat S1, and the luggage compartment part 3 is widened to the usable size obtained by the stowing operation of the vehicle seat S1.

As described above, the vehicle seat S1 is configured to switch its posture between the sitting posture and the stowed posture. Further, the posture may be switched so that only the headrest 30 is independently inclined forward from the sitting posture or the posture may be switched so that only the seatback 20 is independently flipped up from the stowed posture. These various kinds of seat arrangements are realized by various driving mechanisms (specifically, the headrest rotation mechanism 50, the seat cushion flip-up mechanism 60, a seatback reclining mechanism 70, and the like, to be described later) provided in the vehicle seat S1. Hereinafter, a configuration for realizing the seat arrangements of the vehicle seat S1 will be described.

Furthermore, in the description below, the sitting positions of the seat cushion 10, the seatback 20, and the headrest 30 indicate the positions of the seat cushion 10, the seatback 20, and the headrest 30 when the posture of the vehicle seat S1 is held in the sitting posture. Further, the flip-up position of the seat cushion 10 indicates the position of the seat cushion 10, when the posture of the vehicle seat S1 is held in the stowed posture, is located at the front side of the sitting position of the seat cushion 10, and corresponds to the stowed position. Further, the inclining positions of the seatback 20 and the headrest 30 respectively indicate the positions of the seatback 20 and the headrest 30 when the posture of the vehicle seat S1 is held in the stowed posture.

Basic Configuration of Vehicle Seat S1

In order to describe the configuration for realizing the seat arrangement of the vehicle seat S1, the basic configuration of the vehicle seat S1 will be described. As described above, the vehicle seat S1 includes the seat cushion 10, the seatback 20, and the headrest 30.

Figure 3:
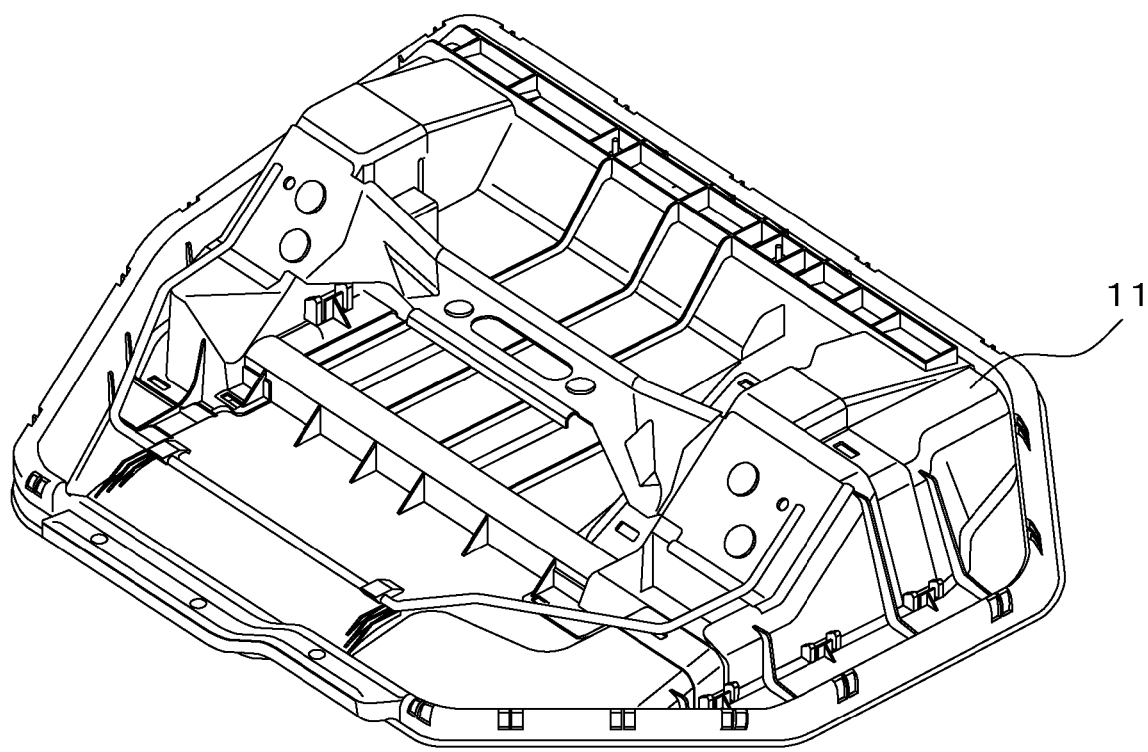
FIG. 3 is a front perspective view illustrating a cushion frame 11.

The seat cushion 10 is formed by mounting a surface material to a cushion frame 11 illustrated in FIG. 3. The mounting of the surface material is obtained by locking a trim cord (not illustrated) sewn to the end of the surface material to the outer edge of the cushion frame 11.

Figure 4:
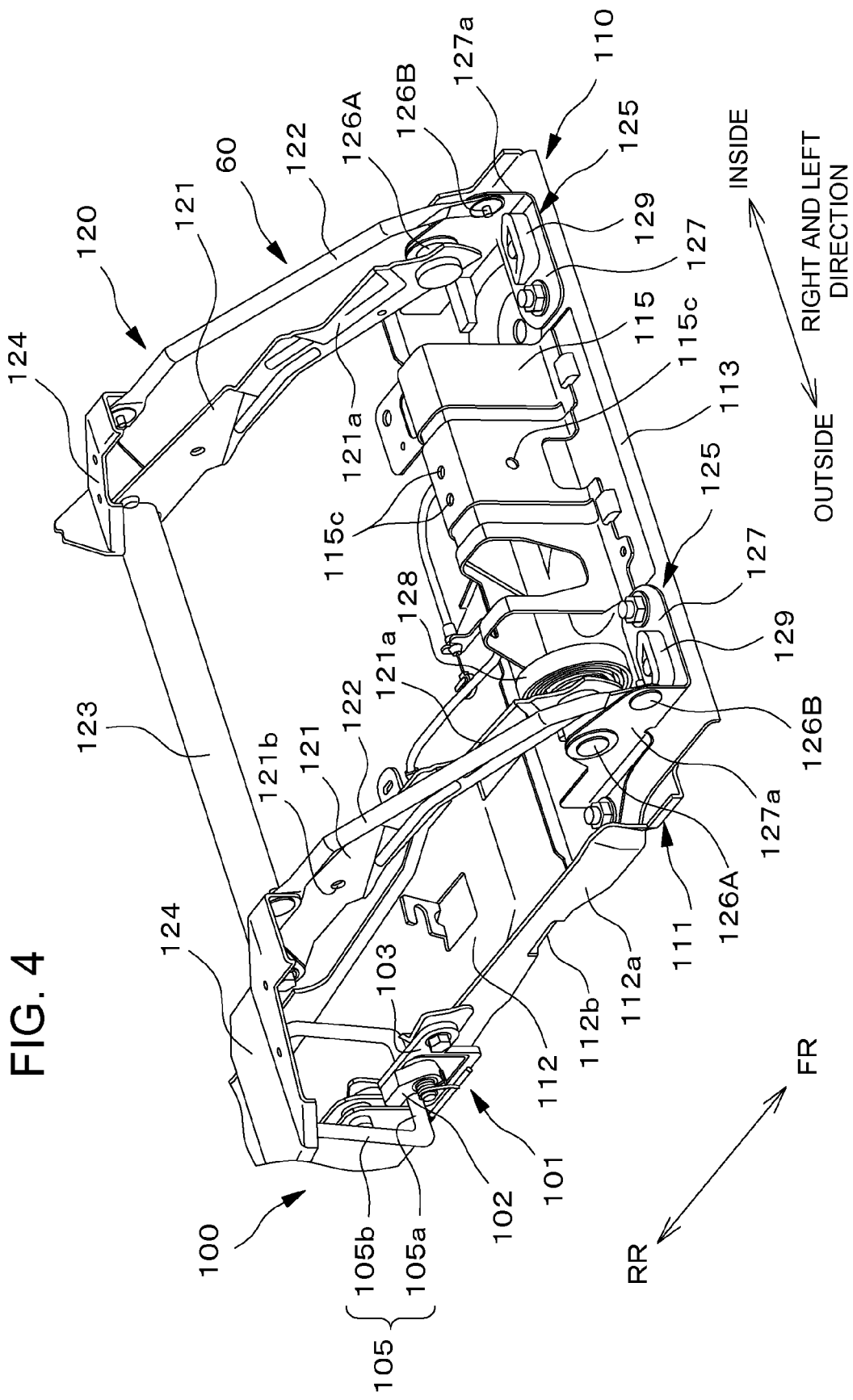
FIG. 4 is a front perspective view (a first diagram) illustrating a seat cushion flip-up mechanism 60 according to a first embodiment.
Figure 5:
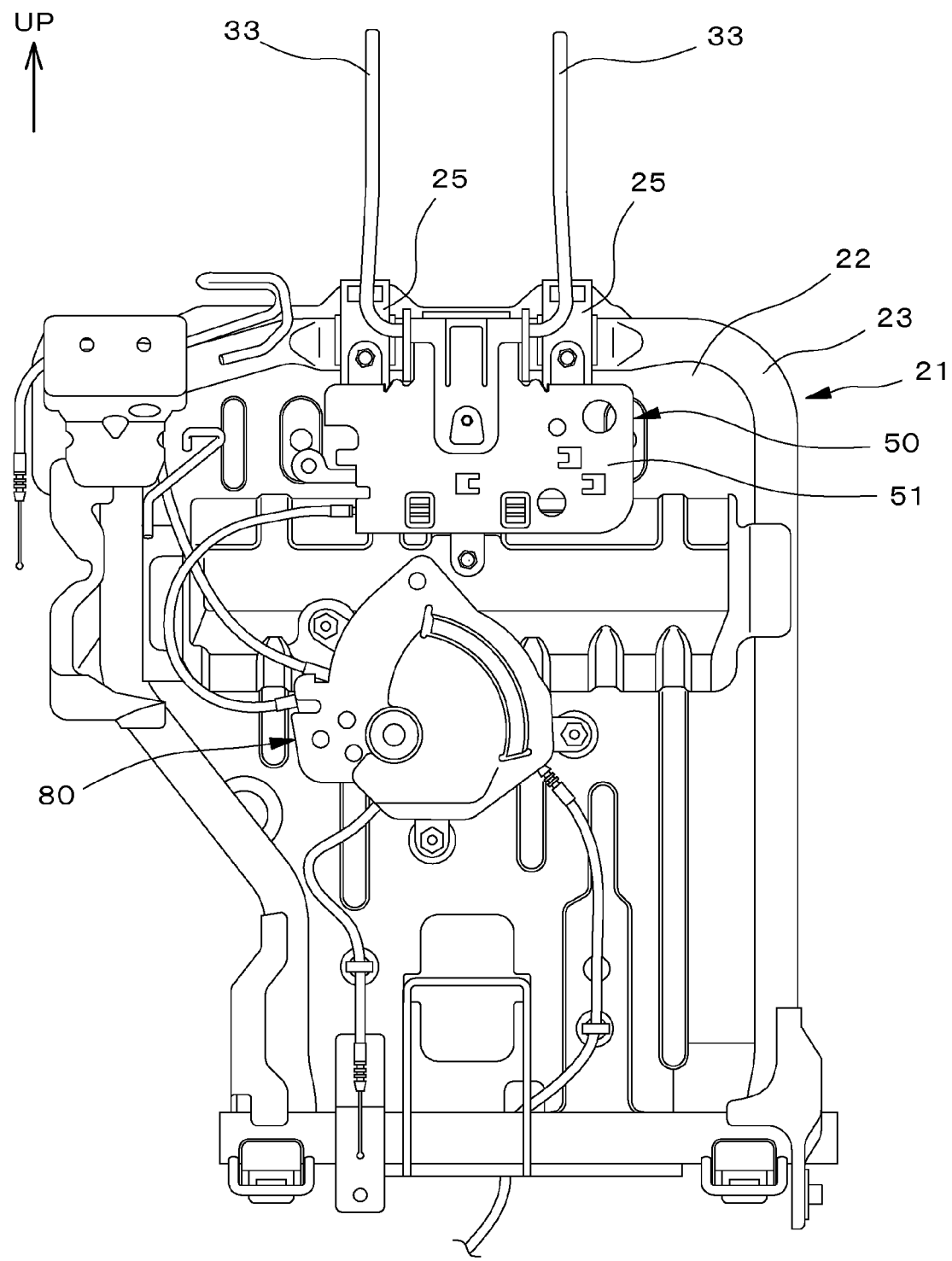
FIG. 5 is a front view of a seat back frame 21 viewed from the front side.

Further, the seat cushion flip-up mechanism 60 illustrated in FIG. 4 is disposed at the lower portion of the seat cushion 10. The seat cushion flip-up mechanism 60 is fixed onto the vehicle body floor 2. Then, the seat cushion flip-up mechanism supports the seat cushion 10, and flips up the seat cushion 10 from the sitting position toward the flip-up position when stowing the vehicle seat S1.

That is, the seat cushion 10 is fixed to the sitting position on the vehicle body floor 2 through the seat cushion flip-up mechanism 60, and is flipped up from the sitting position toward the flip-up position when the seat cushion flip-up mechanism 60 is operated. In other words, the seat cushion 10 may move in a reciprocating manner between the sitting position and the flip-up position.

Furthermore, the seat cushion flip-up mechanism 60 includes a striker lock mechanism 100. The striker lock mechanism 100 fixes the seat cushion 10 to the sitting position when the posture of the vehicle seat S1 is maintained in the sitting posture. The seat cushion flip-up mechanism 60 will be described in detail later.

The seatback 20 rotates to be inclined forward by the seatback reclining mechanism 70, and when an operation unit 77 provided at the upper end of the seatback 20 is operated by an occupant, only the seatback 20 may be inclined forward. Then, the seatback 20 is formed by piling urethane as a cushion material on the seat back frame 21 illustrated in FIG. 5 and covering the seat back frame by a surface material. The seatback frame 21 of the seatback 20 includes a plate-shaped pan frame 22 which forms the base portion of the seatback frame 21 and a pipe frame 23 which forms the outer frame of the seatback frame 21. The pan frame 22 is molded by performing a process such as beading for ensuring rigidity on a substantially rectangular metal sheet. Then, the headrest rotation mechanism 50 and an arrangement unit 80 are mounted to the front surface of the pan frame 22.

Furthermore, the headrest rotation mechanism 50 is a mechanism which rotates a pillar 33 forward so that the headrest 30 is inclined forward, and when the occupant pulls a stowing operation belt-shaped member ST1 in the up to down direction, only the headrest 30 may be inclined forward. Specifically, as illustrated in FIGS. 7 and 8, the headrest rotation mechanism 50 is provided with the stowing operation belt-shaped member ST1 that receives an operation in which the occupant slides the slide member 54, and the stowing operation belt-shaped member ST1 is fastened to one longitudinal end 54a of the slide member 54. Then, when the occupant pulls the stowing operation belt-shaped member ST1, the slide member 54 slides, and a lock member 52 swings to a cancel position along with the pulling operation. Then, when the slide member 54 is slid, the headrest 30 (the pillar 33) may be inclined forward consequently as illustrated in FIG. 9.

The pipe frame 23 is disposed along the outer edge of the pan frame 22 to surround the pan frame 22, and is joined to the pan frame 22 by welding. Furthermore, in the pipe frame 23, a portion located at the lower portion in the up to down direction and a portion facing the outside of the vehicle in the right and left direction are disposed with a gap with respect to the pan frame 22 in the thickness direction of the seatback 20. The reason why such the gap is formed is because, for example, the end of the urethane as the cushion material piled on the seatback frame 21 is trapped between the pan frame 22 and the pipe frame 23.

Further, in the upper end of the seatback frame 21, a portion located at the rear side of the pillar 33 to be described later is provided with a pillar inclination regulating portion 25 which is formed by a downward U-shaped bracket. The pillar inclination regulating portion 25 corresponds to a regulating portion which regulates the rearward rotating (inclining) movement of the pillar 33 when the headrest 30 is located at the sitting position. Furthermore, the pillar inclination regulating portion 25 is provided for each pillar 33 (that is, two pillars), and is welded to the upper end portion of the pipe frame 23.

The seatback 20 with the above-described configuration fits its rotation shaft 20b into a hole portion of a seatback supporting unit 90 (for example, see FIG. 12) fixed to the vehicle body floor 2, and is rotatably supported by the seatback supporting unit 90. Accordingly, the seatback 20 is rotatable in the front to back direction with respect to the vehicle body floor 2, and is movable between the sitting position and the inclining position. Furthermore, in this embodiment, the seatback 20 is adapted to be inclined forward along with the flip-up operation of the seat cushion 10. Further, in this embodiment, only the seatback 20 may be inclined forward.

Figure 6:
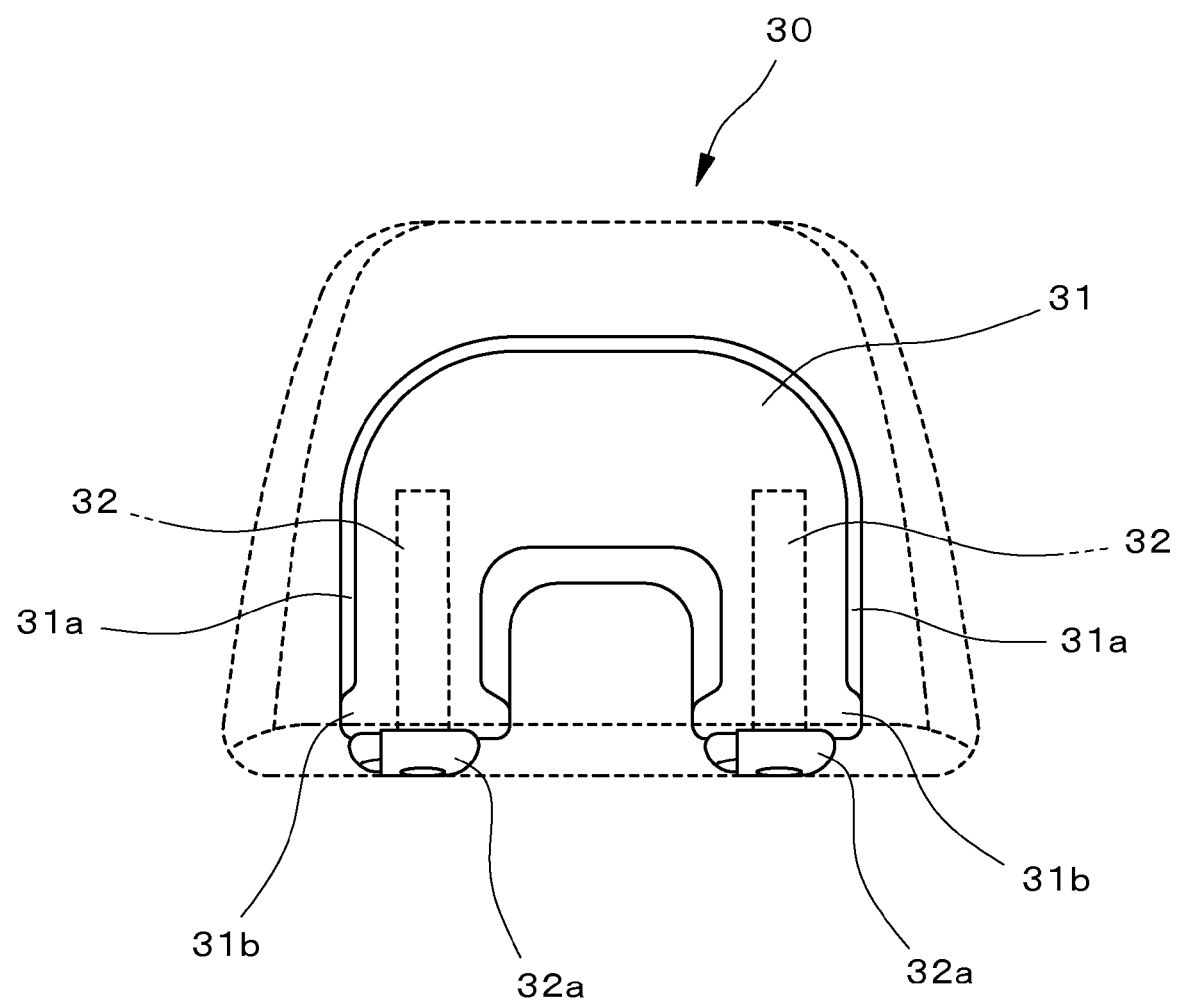
FIG. 6 is a front illustrative view illustrating an inner frame 31 of a headrest 30.

The headrest 30 is provided above the seatback 20 (in other words, the seatback frame 21), and is formed by charging a foaming material between the surface material and the inverse U-shaped inner frame 31 illustrated in FIG. 6. Leg portions 31a which are located at both sides of the inverse U-shaped inner frame 31 are hollow, and each leg portion 31a is provided with a space for accommodating the hollow guide 32. The guide 32 is accommodated inside the leg portion 31a, and is movable forward and backward through an insertion hole (not illustrated) formed in a lower end flange portion 31b of the leg portion 31a of the inner frame 31. Furthermore, the surface material of the headrest 30 is provided with a guide hole (not illustrated) which is formed so that the end of the guide 32 is located at the outside of the surface material.

In the headrest 30 with the above-described configuration, a portion in the periphery of the guide hole in the surface material of the headrest 30 is trapped between the lower end flange portion 31b of the leg portion 31a of the inner frame 31 and a lower end flange 32a of the guide 32 in a state where the guide 32 is located at the farthest retracted position inside the leg portion 31a of the inner frame 31 (a state where the guide is accommodated inside the leg portion 31a except for the lower end flange 32a).

Further, in this embodiment, the headrest 30 is supported by pillars 33 while a pair of pillars 33 (see FIG. 5) formed by metal bars is inserted into the guides 32, and the respective pillars 33 are rotatably supported by a casing 51 of the headrest rotation mechanism 50.

Then, the headrest 30 may be rotated by the headrest rotation mechanism 50 until the headrest is inclined forward by about 90° from the state where the headrest stands above the seatback 20. Furthermore, in this embodiment, the headrest 30 is rotated to be inclined forward along with the flip-up operation of the seat cushion 10. Further, only the headrest 30 may be inclined forward.

Seat Cushion Flip-Up Mechanism

When the seat cushion flip-up mechanism 60 receives an operation in which the occupant performs a stowing operation for stowing the vehicle seat S1, the seat cushion flip-up mechanism flips up the seat cushion 10 toward the flip-up position as an operation of stowing the vehicle seat S1. In other words, the seat cushion flip-up mechanism 60 performs a start operation of moving the seat cushion 10 from the sitting position toward the flip-up position, that is, a flip-up operation.

The seat cushion flip-up mechanism 60 is covered by a cover 200 to be described later, and is provided on the vehicle body floor 2 to be located below the seat cushion 10 when the seat cushion 10 is located at the sitting position.

Figure 10:
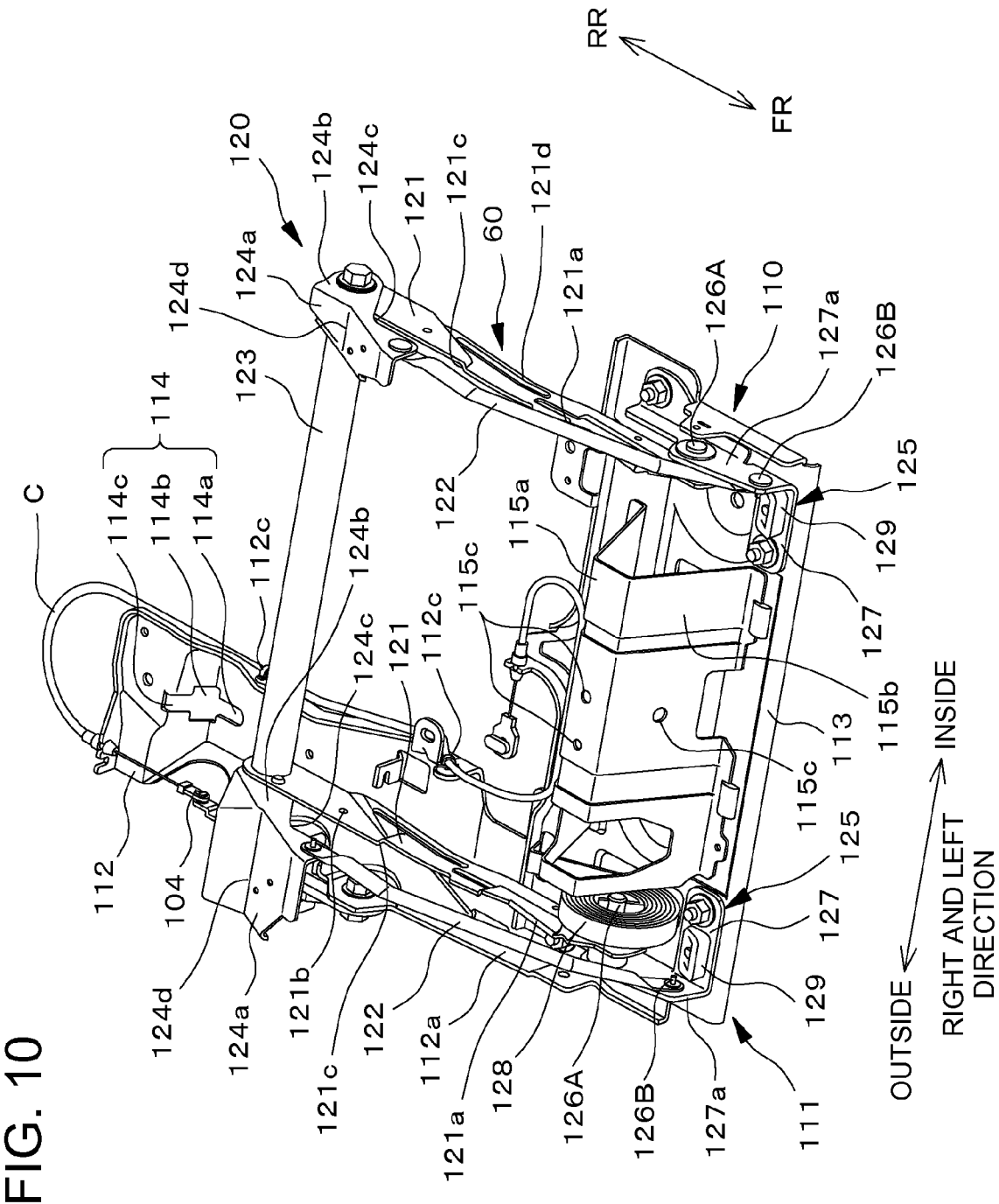
FIG. 10 is a front perspective view (a second diagram) illustrating a seat cushion flip-up mechanism 60 according to the first embodiment.
Figure 11:
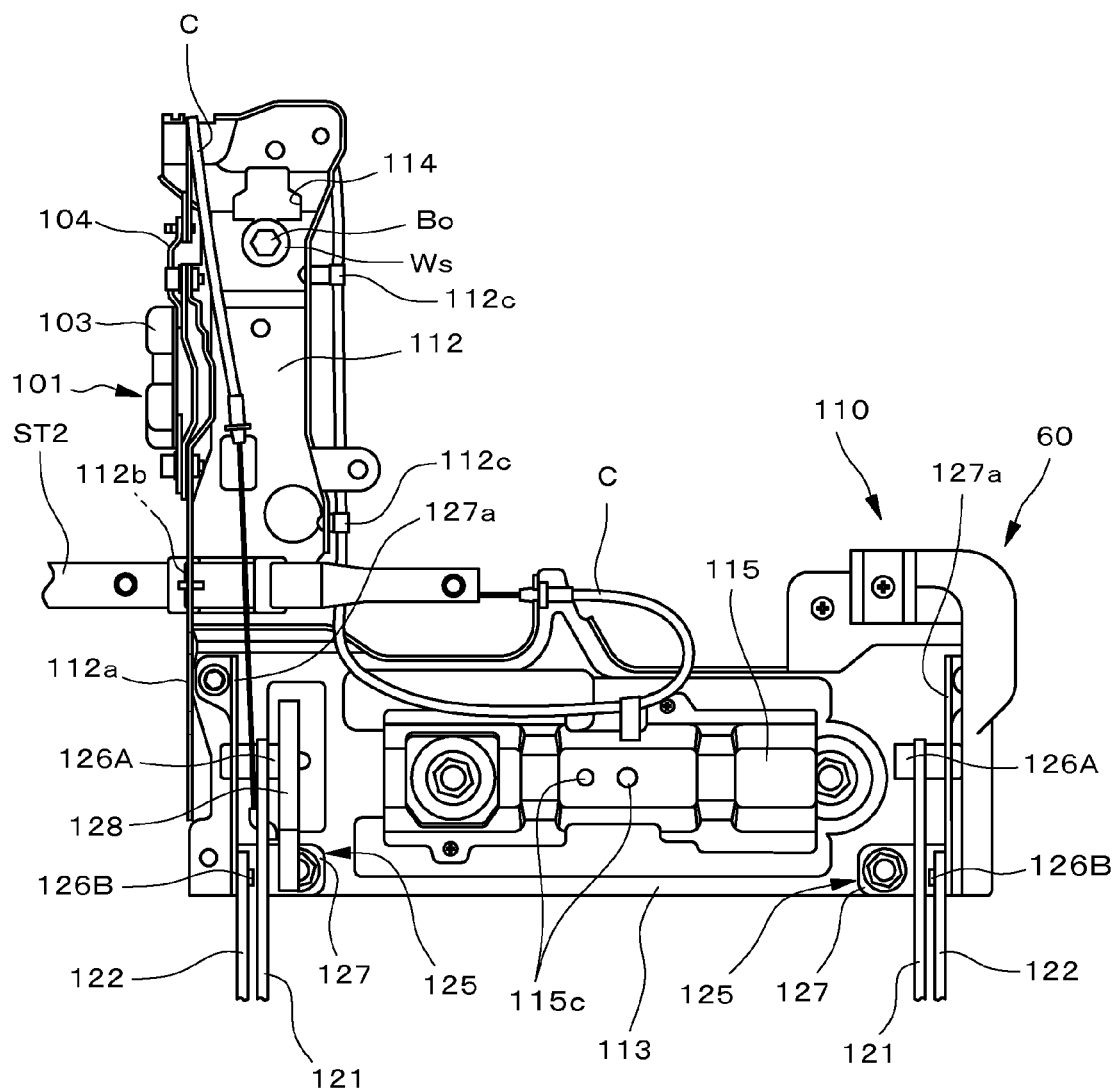
FIG. 11 is a plan view of the seat cushion flip-up mechanism 60 according to the first embodiment viewed from the upside.
Figure 12:
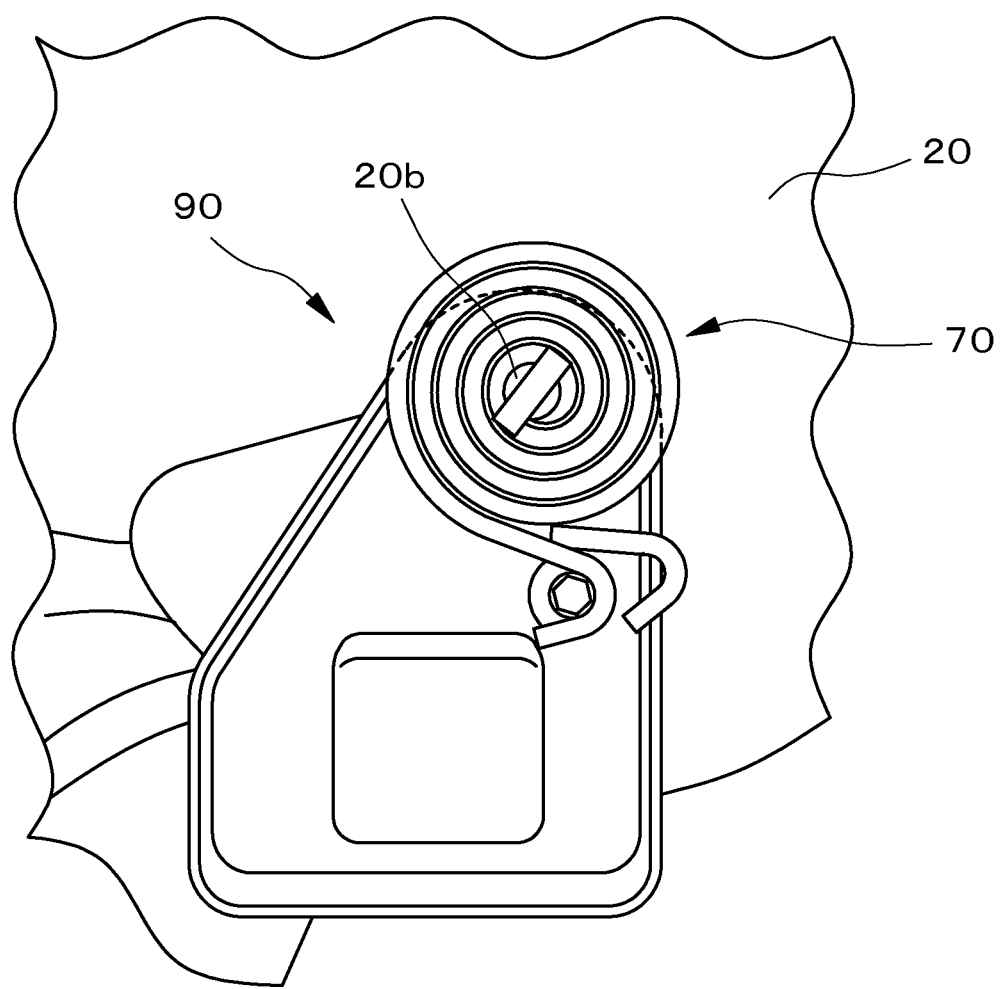
FIG. 12 is a side view of a seatback supporting unit 90 viewed from the side.

As illustrated in FIGS. 4, 10, and 11, the seat cushion flip-up mechanism 60 includes two subunits, where one subunit is a mounting unit 110 which is mounted to the vehicle body floor 2, and the other subunit is a movable unit 120 which is disposed on the mounting unit 110 and swings (rotates) with respect to the mounting unit 110 (in other words, the vehicle body floor 2).

The mounting unit 110 mainly includes the mounting plate 111 which is formed in an L-shape in a top view. In the mounting plate 111, the first plate portion 112, as a mounting member which extends in the front to back direction of the vehicle 1, is fixed to the vehicle body floor 2 by the bolt Bo and the washer Ws fastened to the vehicle body floor 2 (see FIG. 11). Here, the rear end of the first plate portion 112 is provided with a mounting hole 114 formed in an elongated hole shape, and when the bolt Bo and the washer Ws set to the vehicle body floor 2 in advance are fitted to the mounting hole 114, the mounting unit 110 is disposed on the vehicle body floor 2.

Furthermore, the center portion 114b of the mounting hole 114 in the longitudinal direction has a width that is larger to some extent than that of the front end 114a or the rear end 114c. When fitting the bolt Bo and the washer Ws to the mounting hole 114 by using such a configuration, the bolt Bo and the washer Ws first pass through the center portion 114b of the mounting hole 114 in the longitudinal direction, and the mounting unit 110 is positioned by displacing the position of the mounting unit 110 so that the bolt Bo is fitted to the front end 114a of the mounting hole 114 in the longitudinal direction.

Further, a lock portion 101 of the striker lock mechanism 100 is mounted to substantially the center portion of the first plate portion 112 in the longitudinal direction. The lock portion 101 includes a hook-shaped lock piece 102 and a housing 103 which accommodates the lock piece 102 in a swingable state. In a state where the lock piece 102 engages with a striker 105 to be described later, the seat cushion 10 is fixed onto the vehicle body floor 2 at the sitting position. When the lock piece 102 swings, the engagement state of the striker 105 with respect to the lock piece 102 is canceled, and hence the seat cushion 10 is canceled from the state where the seat cushion is fixed onto the vehicle body floor 2 to be movable.

Further, one side portion of the first plate portion 112 is provided with an upright wall portion 112a, and in the upright wall portion 112a, a slit 112b through which the stowing operation belt-shaped member ST2 passes is formed to some extent at the front position of the mounting position of the lock portion 101. The stowing operation belt-shaped member ST2, which passes through the slit 112b, is disposed on the first plate portion 112 to intersect the first plate portion 112. Further, one end of a cable C is connected to the end of the stowing operation belt-shaped member ST2 (the end at the inside of the vehicle 1 when viewed from the first plate portion 112), and path defining portions 112c for defining the wiring path when wiring the cable C are provided at an appropriate interval in the side portion of the first plate portion 112 (the side portion opposite to the position of the upright wall portion 112a).

Then, the other end of the cable C is connected to a connection piece 104 connected to the lock piece 102. Accordingly, when the stowing operation belt-shaped member ST2 is pulled, the cable C pulls the lock piece 102 through the connection piece 104. As a result, the lock piece 102 swings, so that the engagement between the lock piece 102 and the striker 105 is canceled.

In the mounting plate 111, a second plate portion 113 as a fixing member that extends in the right and left direction of the vehicle 1 (the width direction of the vehicle seat S1) is a base portion of the movable unit 120, and its center portion in the longitudinal direction is provided with a submarine bracket 115 which prevents a submarine phenomenon in which the occupant sitting on the seat cushion 10 moves under the waist belt in the event of the collision of the vehicle 1.

The submarine bracket 115 includes a pair of upright portions 115a which is formed by plate members formed upright from the upper surface of the second plate portion 113 and a connection portion 115b which connects the pair of upright portions 115a to each other. In this way, since the submarine bracket 115 includes the pair of upright portions 115a, it is possible to reinforce the second plate portion 113 to be attached and hence to improve the rigidity with respect to the load from the occupant. Further, since the pair of upright portions 115a is connected by the connection portion 115b, the upright portions 115a, the connection portion 115b, and the second plate portion 113 form a closed-cross-sectional structure. Accordingly, the rigidity of the second plate portion 113 may be further improved compared to the configuration including only the upright portion 115a.

The upright portions 115a of the submarine bracket 115 are disposed in the front to back direction to interpose a rotation shaft 126A of a link 121 to be described later. That is, the rotation shaft 126A is disposed between the pair of upright portions 115a in the side view. In this way, when the rotation shaft 126A to which a large load is applied is interposed between the upright portions 115a, the rigidity in the periphery of the rotation shaft 126A is improved, and hence the link 121 may be stably rotated.

Furthermore, as illustrated in FIGS. 4, 10, and 11, an appropriate portion of the submarine bracket 115 is provided with a positioning hole 115c which positions the cover 200.

Configuration of the Movable Unit 120

The movable unit 120 has a substantially door-like structure, and is fixed to the second plate portion 113 of the mounting plate 111 by a bolt. The movable unit 120 includes a pair of links 121, pipe rods 122 which serve as a pair of guide members, a mounting bracket 124 which is used for the mounting of the seat cushion 10, a connection bar 123 which is installed in the mounting bracket 124 to connect the links 121 to each other, and the pair of support mechanisms 125 which rotatably supports the links 121 and the pipe rods 122. These components are combined to be integrated as a unit, and are integrally mounted as a unit when these components are mounted to the second plate portion 113 of the mounting plate 111.

Each of the pair of links 121 disposed while being separated from each other in the right and left direction (the seat width direction) is an elongated body which is formed by performing a process such as beading on a metal sheet, and the links are respectively located at both side portions of the movable unit 120. Each link 121 is rotatably supported in a manner that the rotation shaft 126A is fitted to a guide hole (not illustrated) formed in the lower end of the link. Further, the upper ends of the respective links 121 are mounted with the connection bar 123 as a connection member that connects the links 121 to each other. Further, the mounting bracket 124 is mounted to the outer surface of the upper end of each link 121. That is, each link 121 rotates while fixing and supporting the seat cushion 10. Furthermore, the connection bar 123 and the mounting bracket 124 are mounted to the upper end of the link 121 by a bolt according to a common fastening type.

The mounting bracket 124 includes a mounting surface portion 124a to which the seat cushion 10 is fixed and a side surface flange portion 124b which extends from the side end of the mounting surface portion 124a. The side surface flange portion 124b is formed to extend from any end of the mounting surface portion 124a in the right and left direction, and is bent in a direction substantially perpendicular to the mounting surface portion 124a.

The upper end of the link 121, the end of the connection bar 123, and the upper end of the pipe rod 122 are fixed to the side surface flange portion 124b (more specifically, the inner surface of the side surface flange portion 124b). In this way, since the ends of the link 121, the connection bar 123, and the pipe rod 122 are attached to the inner surface of the side surface flange portion 124b (the inner surface of the vehicle seat S11 in the seat width direction), the attachment portions of the link 121, the connection bar 123, and the pipe rod 122 concentrate on one position. Accordingly, as described above, the size of the attachment portions of the respective components do not increase even in a portion mounted with plural members, and hence the space may be further saved.

Then, in the side surface flange portion 124b, a concave portion 124c is provided between the fixing position of the connection bar 123 and the fixing position of the pipe rod 122. In this way, since the side surface flange portion 124b is provided with the concave portion 124c, the mounting bracket 124 may be decreased in weight compared to the case where the concave portion 124c is not provided.

The mounting surface portion 124a is not a smooth plane, and is provided with a bent portion 124d which is bent in the right and left direction. In this way, since the mounting surface portion 124a of the mounting bracket 124 is not formed into a plane and is provided with the bent portion 124d, the rigidity of the mounting bracket 124 may be improved.

The distance between the upper ends of the pair of links 121 attached to the mounting brackets 124 is larger than the distance between the lower ends thereof. As a result, since the larger distance between the pair of mounting brackets 124 may be ensured, the seat cushion 10 may be stably supported.

The link 121 has a first bent portion 121c which is formed in the intermediate portion of the link in the longitudinal direction. The first bent portion 121c is formed in a Z-shape in the top view so that the upper end of the link 121 is widened in the right and left direction. With this configuration, in the links 121 which are disposed as a pair, the distance between the upper ends becomes larger than the distance between the lower ends.

Further, the link 121 is provided with a second bent portion 121d which is formed to be continuous to the first bent portion 121c. In this way, since not only the first bent portion 121c but also the second bent portion 121d are provided and the first bent portion 121c and the second bent portion 121d are formed continuously, the rigidity of the link 121 is improved.

Further, since the first bent portion 121c and the second bent portion 121d are formed to be continuous to each other, the rigidity of the link 121 may be further improved.

Figure 15:
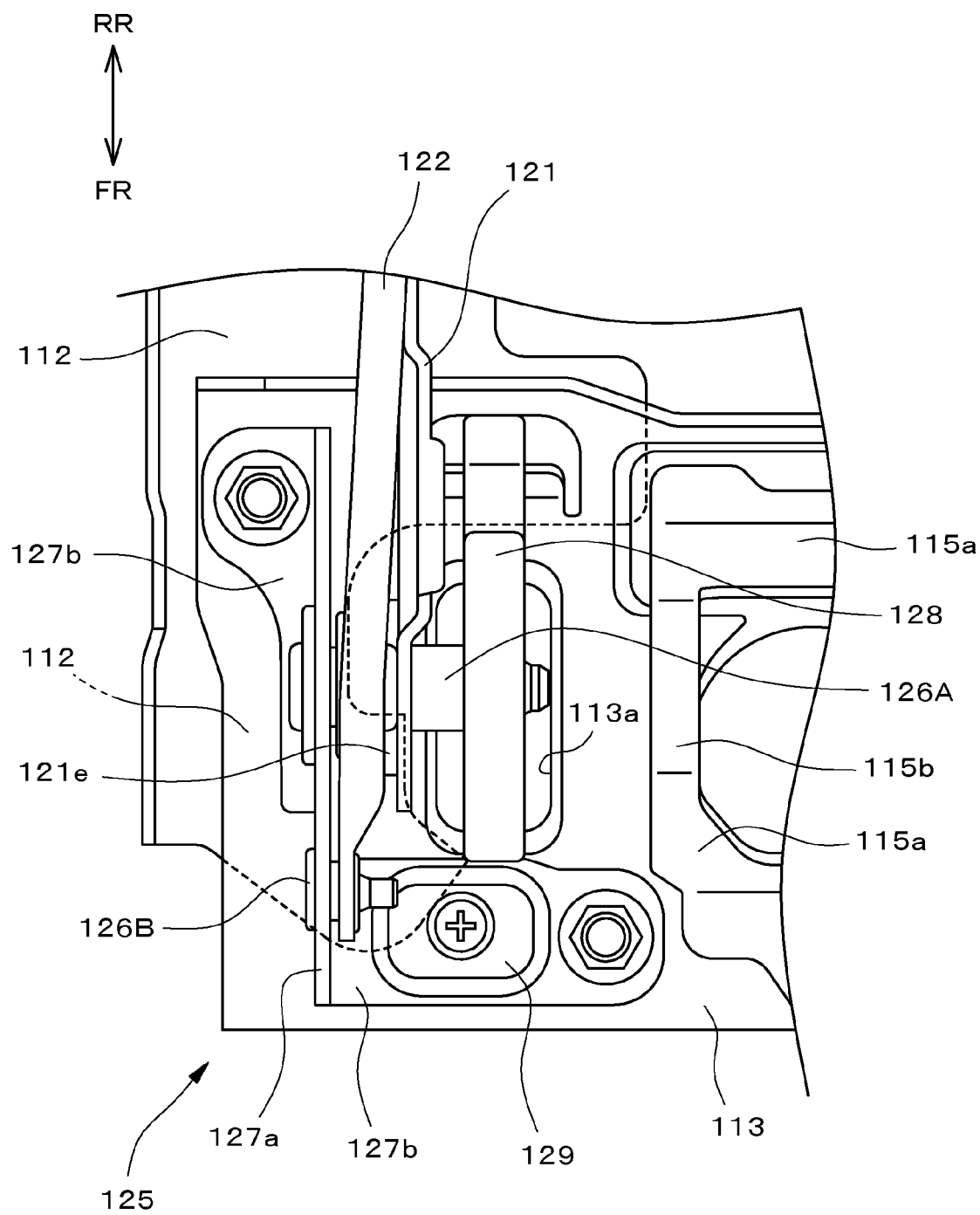
FIG. 15 is a plan view of a support mechanism 125 viewed from the upside.

Moreover, as illustrated in FIG. 15, a reinforcement collar 121e is integrally formed with the lower end of the link 121 (the vicinity of the rotation shaft 126A), and hence the vicinity of the rotation shaft 126A is reinforced. Accordingly, the link 121 may stably rotate. Further, a base bracket 127 is provided at the outside of the reinforcement collar 121e in the right and left direction (the seat width direction). Furthermore, the configuration of the base bracket 127 will be described later.

The distance between the pair of links 121 is larger than the width of the headrest 30 provided above the seatback 20. Further, the distance from the first bent portion 121c of the link 121 to the lower end of the link 121 is larger than the thickness of the headrest 30.

With the above-described configuration, since the headrest 30 may be stowed between the links 121 when the vehicle seat S11 is stowed, the vehicle seat S11 may be stowed in a compact size.

Each of the pair of pipe rods 122 is an elongated body which is disposed in substantially parallel to the link 121 in the front to back direction, and when a rotation shaft 126B is fitted to a guide hole (not illustrated) formed in the lower end of the pipe rod, the pipe rod is supported to be rotatable in the same direction as the rotation direction of the link 121. Further, the mounting bracket 124 is pinned to the upper end of each pipe rod 122. That is, in this embodiment, the seat cushion 10 is supported by the pair of links 121 and the pair of pipe rods 122 through the mounting brackets 124. Then, each pipe rod 122 moves to follow the rotation of the link 121, and rotates in the same direction as the rotation direction of the link 121.

When the seat cushion 10 is held in the sitting posture (that is, the state of FIG. 10), the end of the pipe rod 122 fixed to the mounting bracket 124 is disposed at the front side of the end of the link 121 fixed to the mounting bracket 124. In this way, when the link 121 with the higher rigidity is disposed at the rear side, the link 121 and the pipe rod 122 may be stably rotated when the seat cushion 10 is returned to the sitting posture.

The pipe rod 122 is a member that is disposed in substantially parallel to the link 121, and is formed to be shorter than the link 121. Then, when the rotation shaft 126A of the link 121 and the rotation shaft 126B of the pipe rod 122 are substantially assembled at the same height in the front to back direction, the link 121 and the pipe rod 122 may stably rotate when the seat cushion 10 is stowed.

Further, the pipe rod 122 is mainly formed by a metallic linear member or a tubular member. When the pipe rod 122 is formed by the tubular member, the rigidity is desirably improved. Furthermore, when both ends of the pipe rod 122 are pressed into a flat shape, both ends may be easily fixed to the other components. In this way, when the pipe rod 122 is formed by a linear member or a tubular member, the pipe rod may be manufactured at low cost. Further, since the configuration of the pipe rod 122 is simplified, it is preferable that the manufacturing process does not become complex.

Moreover, a part of the pipe rod 122 is curved. Then, the curving direction is formed so that the pipe rod bulges toward the opposite side to the arrangement side of the link 121. With this configuration, it is possible to prevent the contact between the link 121 and the pipe rod 122 in the movable range from the sitting position to the flip-up position. As a result, the link 121 and the pipe rod 122 may be further stably rotated.

The pipe rod 122 is disposed below the connection bar 123 when the seat cushion 10 is stowed. More specifically, the end of the pipe rod 122 attached to the mounting bracket 124 is disposed below the connection bar 123. In this way, when the pipe rod 122 is disposed below the connection bar 123, it is preferable that the size of the periphery of the pipe rod 122 does not increase when the seat cushion 10 is stowed.

Moreover, the striker 105 of the striker lock mechanism 100 is mounted to the lower surface (more specifically, the bent portion 124d formed in the mounting surface portion 124a) of the mounting bracket 124 mounted to the link 121 and the pipe rod 122 on the side facing the outside of the vehicle 1 among the pair of links 121 and the pipe rods 122. Then, when the link 121 and the pipe rod 122 rotate toward the rear side when viewed from the rotation shafts 126A and 126B, the striker 105 reaches a portion where the striker may engage with the lock piece 102 of the lock portion 101 provided in the mounting plate 111 (more specifically, the first plate portion 112).

The striker 105 is attached to the opposite side to the surface provided with the link 121 and the pipe rod 122 in the side surface flange portion 124b. Then, the link 121 and the pipe rod 122 are fixed to the inside of the side surface flange portion 124b in the right and left direction (the seat width direction), and the striker 105 is mounted to the outside of the side surface flange portion 124b in the right and left direction (the seat width direction). In this way, since the striker 105 is provided at the outside in the right and left direction (the seat width direction), the striker 105 does not interfere with the link 121 and the pipe rod 122. Further, since the striker 105 is provided at the outside of the link 121 and the pipe rod 122, it is preferable that the distance between the pair of links 121 forming the seat width direction and the distance between the pair of pipe rods 122 do not increase.

The striker 105 includes a hook portion 105a which is bent to extend in the horizontal direction and engages with the lock piece 102 and an attachment portion 105b which is provided to extend from both ends of the hook portion 105a toward the mounting bracket 124 and is attached to the mounting bracket 124. Then, the hook portion 105a is disposed between the end of the link 121 attached to the mounting bracket 124 (more specifically, the side surface flange portion 124b) and the end of the pipe rod 122.

In this way, since the hook portion 105a of the striker 105 is disposed between the end of the rotatably attached link 121 and the end of the pipe rod 122, the sitting load may be stably received when the occupant sits on the seat cushion 10.

Further, the attachment portion 105b of the striker 105 is fixed to the bent portion 124d of the mounting bracket 124.

More specifically, the end (the upper end) of the attachment portion 105b of the striker 105 is fixed to the bent portion 124d of the mounting bracket 124 by welding or the like. Accordingly, since the attachment portion 105b of the striker 105 is fixed to the bent portion 124d with high rigidity, the rigidity with respect to the occupant's sitting load is further improved. Furthermore, it is preferable that the end of the attachment portion 105b fixed to the mounting bracket 124 be curved along the mounting bracket 124 and the curved portion be fixed to the bent portion 124d of the mounting bracket 124.

Configuration of the Support Mechanism 125

Each of the pair of support mechanisms 125 is used to rotatably support the link 121 and the pipe rod 122, and the lower side thereof is provided with the second plate portion 113. As illustrated in FIGS. 4, 10, and 11, the support mechanism 125 includes a base bracket 127, a spiral spring 128, and a damper rubber 129 in addition to the rotation shafts 126A and 126B.

The base bracket 127 is a metal sheet which is formed in a substantially Z-shape in the top view, forms the base of the movable unit 120, and is fixed to the second plate portion 113 of the mounting plate 111 by a bolt. Further, in the base bracket 127, a portion which extends in the front to back direction of the vehicle 1 becomes an upright wall portion 127a, and the rotation shafts 126A and 126B are fixed to the upright wall portion 127a.

Then, the rotation shaft 126A of the link 121 and the rotation shaft 126B of the pipe rod 122 are formed on the same plane. More specifically, the axes (the rotation centers) of the rotation shaft 126A and the rotation shaft 126B are provided on the same plane (see FIGS. 4 and 10). In this way, since the rotation shaft 126A and the rotation shaft 126B are substantially formed on the same plane, the size increase in the height direction may be suppressed.

The link 121 and the pipe rod 122 are fixed to the inside of the upright wall portion 127a in the right and left direction (the seat width direction). In this way, when the link 121 and the pipe rod 122 are attached to the inside of the upright wall portion 127a, the link 121 and the pipe rod 122 may be protected from the external force. Further, it is preferable that the size of the vehicle seat S11 does not increase in the seat width direction.

Further, the base bracket 127 also includes a fixing portion 127b which is fixed to the second plate portion 113 (the vehicle body floor 2), and the upright wall portion 127a is formed to be bent in a direction substantially perpendicular to the fixing portion 127b.

The fixing portions 127b are provided at two positions through the upright wall portions 127a, and the respective fixing portions 127b are fixed to the second plate portion 113 (the vehicle body floor 2) by a lock member such as a bolt. At this time, the lock member is disposed at the diagonal position, and the rotation shaft 126A of the link 121 is disposed at the diagonal position. With such a configuration, the link 121 may be stably rotated.

Moreover, the lock member that is fastened to one fixing portion 127b is disposed on the substantially same line as that of the upright portion 115a disposed at the front side among the pair of upright portions 115a of the submarine bracket 115. More specifically, the lock member that is fastened to the fixing portion 127b is disposed on the substantially same line as that of the joint point between the second plate portion 113 and the upright portion 115a disposed at the front side. Then, the line passing through the joint point of the upright portion 115a and the lock member is substantially perpendicular to the extension direction of the link 121 (see FIG. 15).

Further, the lock member that is fastened to the other fixing portion 127b is attached onto the substantially same line as that of the upright portion 115a disposed at the rear side among the pair of upright portions 115a of the submarine bracket 115. More specifically, the joint point between the second plate portion 113 and the upright portion 115a disposed at the rear side and the lock member fastened to the fixing portion 127b are disposed on the substantially same line. Then, the line passing through the joint point (the joint portion) of the upright portion 115a and the lock member is formed to be substantially perpendicular to the extension direction of the link 121.

In this way, when the upright portion 115a of the submarine bracket 115 and the lock member fixing the base bracket 127 are locked in the same line, the second plate portion 113 between the pair of base brackets 127 disposed at the right and left direction while being separated from each other is reinforced, and hence the rigidity with respect to the load may be improved.

Further, the base bracket 127 is disposed at a position where the base bracket substantially overlaps the spiral spring 128 in the front to back direction. In this way, since the base bracket 127 and the spiral spring 128 do not overlap each other in the height direction, the support mechanism 125 may be provided in a compact size.

As illustrated in FIG. 15, the spiral spring 128 is provided above an opening portion 113a. In other words, the opening portion 113a is provided at a position where the opening portion faces the spiral spring 128 in the up to down direction. With such a configuration, the spiral spring 128 may approach the second plate portion 113 in the height direction without contact (the interference) between the spiral spring 128 and the second plate portion 113. Accordingly, it is preferable that the mounting height of the spiral spring 128 does not increase.

Moreover, the spiral spring 128 may be disposed inside the opening portion 113a. When the spiral spring 128 is disposed inside the opening portion 113a, it is preferable that the size of the mounting portion of the spiral spring 128 is further decreased in the height direction.

Further, when the second plate portion 113 is provided with the opening portion 113a, the contact between the spiral spring 128 and the second plate portion 113 may be prevented. As a result, it is preferable that abnormal noise generated by the contact between the spiral spring 128 and the second plate portion 113 may be prevented.

When the link 121 rotates forward by the biasing force of the spiral spring 128 and reaches the forward limit position, the damper rubber 129 contacts the front end of the link 121 to absorb the impact generated in the link 121. The damper rubber 129 is fixed to the base bracket 127 to be slightly located at the front side of the rotation support point of the link 121.

Furthermore, in this embodiment, in order to prevent the cutting of the damper rubber 129 due to the contact (collision) of the link 121 with respect to the damper rubber 129, a contact portion 121a contacting the damper rubber 129 in the longitudinal direction of the link 121 is bent to increase the plate thickness, and hence a large area contacting the damper rubber 129 is ensured. Accordingly, the contact portion 121a may stably contact the damper rubber 129. Further, since the contact portion 121a is bent so that the front end thereof is rounded, it is possible to prevent the damper rubber 129 from being damaged when the damper rubber 129 contacts the contact portion 121a.

The spiral spring 128 is provided in the support mechanism 125 located at the outside of the vehicle 1 among the pair of support mechanisms 125. The spiral spring 128 is a biasing member that biases the link 121 so that the link is inclined forward. The rotation shaft 126A is locked to one end of the spiral spring 128, and the other end of the spiral spring is locked to a protrusion 121*f* which protrudes from the side surface of the link 121 in a state where the link 121 is inclined rearward (in other words, a state before the seat cushion 10 is flipped up) (see FIG. 25). Furthermore, in this embodiment, the spiral spring 128 and the rotation shaft 126A are locked in a manner that the front end of the rotation shaft 126A is formed in a split-pin shape, one end of the spiral spring 128 is trapped in the divided pins, and the front end of the rotation shaft 126A is pressed and crushed.

With the above-described configuration, when the striker 105 engages with the lock piece 102, the seat cushion 10 is held at the sitting position while receiving the biasing force of the spiral spring 128 (in other words, against the biasing force of the spiral spring 128) through the link 121. When the engagement between the striker 105 and the lock piece 102 is canceled, the link 121 rotates forward by the biasing force of the spiral spring 128, so that the seat cushion 10 is flipped up toward the flip-up position. That is, the flip-up operation using the seat cushion flip-up mechanism 60 indicates an operation in which the link 121 fixing and supporting the seat cushion 10 is rotated forward by the biasing force of the spiral spring 128.

Furthermore, in the cases illustrated in FIGS. 4, 10, and 11, the spiral spring 128 is provided in only one of the pair of links 121, but the present invention is not limited thereto. For example, the spiral spring 128 may be provided in each of both links 121.

Moreover, in this embodiment, an insertion hole 121*b* is formed at the halfway position of one link 121 (the link 121 located at the outside of the vehicle 1) in the longitudinal direction, and one end of the cable C is inserted into the insertion hole 121*b*. The other end of the cable C is connected to the arrangement unit 80. Accordingly, when the seat cushion 10 is flipped up, the link 121 rotates, and the cable C connected to the link 121 is pulled. Then, in the arrangement unit 80 connected with the cable C, the respective components of the unit are operated by using the pulling force of the cable C. Finally, the pulling operation of the cable C is transmitted to the seatback 20 or the headrest 30, so that the seat cushion 10 moves along with the flip-up operation and the seatback 20 and the headrest 30 are respectively inclined forward.

Configurations of the First Plate Portion 112 and the Second Plate Portion 113

A configuration, in which the seat cushion 10 is mounted to the vehicle body floor 2 in the vehicle seat S1 switchable between the sitting posture and the stowed posture of stowing the vehicle seat in a forward inclined state, will be described below by referring to FIGS. 10 and 11 and FIGS. 13 to 16.

The mounting plate 111 includes the first plate portion 112 which serves as a mounting member and the second plate portion 113 which serves as a fixing member disposed to overlap the first plate portion 112, and is assembled to the vehicle body floor 2. Further, when the bolt Bo and the washer Ws as the lock members provided in advance in the vehicle body floor 2 engage with the mounting hole 114 as the lock portion formed in the first plate portion 112 and the bolt Bo is fastened, the first plate portion 112 is fixed to the vehicle body floor 2.

The first plate portion 112 is disposed in the extension direction of the link 121, and the front end of the first plate portion 112 is disposed to overlap the end of the second plate portion 113 and is fixed to the vehicle body floor 2 to have an L-shape in the top view. Then, when the seat cushion 10 is held at the sitting posture, the first plate portion 112 extends toward the rear side of the link 121. That is, the first plate portion 112 is formed to be longer than the link 121, and extends rearward relative to the mounting bracket 124 and the connection bar 123 attached to the upper end of the link 121.

In this way, the first plate portion 112 which is provided to extend in the front to back direction is provided to extend rearward relative to the link 121, and the mounting plate 111, which includes the first plate portion 112 and the second plate portion 113, is formed to be larger than the link 121. In the mounting plate 111 fixed to the vehicle body floor 2 to have an L-shape in the top view, the movable unit 120 is provided above the mounting plate, and hence the movable unit may be easily inclined toward the side without the mounting plate 111 (that is, the direction indicated by the arrow of the thick line in FIG. 16). However, since the large length of the first plate portion 112 is ensured, it is possible to prevent the inclination of the movable unit 120 (also including the mounting unit 110) provided above the mounting plate 111.

As a result, since it is possible to prevent the seat cushion 10 from being easily inclined, the support rigidity with respect to the load of the occupant is improved.

Further, one end (the front end) of the first plate portion 112 is disposed below one end of the second plate portion 113, and is disposed at a position trapped between the vehicle body floor 2 and the second plate portion 113. In this way, when the front end of the first plate portion 112 is pressed downward by the second plate portion 113, the front end of the first plate portion 112 may be prevented from being moved upward, and hence the components such as the link 121 and the pipe rod 122 may be prevented from being inclined in the direction indicated by the arrow of the thick line of FIG. 16.

Furthermore, the second plate portion 113 is provided with plural boss-shaped portions (bulging portions) 113*c* which protrude downward, and the boss-shaped portions 113*c* are fixed to the vehicle body floor 2 by the lock members. At this time, since the portion (the plane portion) other than the boss-shaped portions 113*c* is separated from the vehicle body floor 2 by the degree of the boss-shaped portions 113*c*, the first plate portion 112 may be fitted and attached to such a separated space.

As a result, the attachment configurations of the first plate portion 112 and the second plate portion 113 may be provided in a compact size.

Further, the first plate portion 112 is provided below one link 121 (more specifically, the link 121 provided at the outside in the seat width direction) among the pair of links 121. At this time, the link 121 is disposed to be received between both ends (the inner end and the outer end) of the first plate portion 112 in the right and left direction (the seat width direction).

In this way, when one link 121 of the pair of links 121 is disposed above the first plate portion 112, the link 121 is stably fixed to the vehicle body floor 2, and hence the mounting unit 110 and the movable unit 120 may not be easily inclined.

Moreover, the front end (the portion overlapping the second plate portion 113) of the first plate portion 112 is not formed in a complete rectangular shape, but is partly notched. More specifically, the front end and the inner edge in the seat width direction of the first plate portion 112 are notched, and the spiral spring 128 is attached to the notched portion. Then, as illustrated in FIG. 15, since the portion provided with the spiral spring 128 is also equipped with the second plate portion 113 or the opening portion 113a, the spiral spring 128 is disposed to be closer to the vehicle body floor 2. Accordingly, the size increase of the attachment portion of the spiral spring 128 may be prevented in the height direction.

Then, since the front end of the first plate portion 112 is disposed at the outside of the spiral spring 128 in the seat width direction and the front end of the first plate portion 112 is pressed downward by the second plate portion 113, the mounting unit 110 is stably fixed to the vehicle body floor 2 and the movable unit 120 supporting the seat cushion 10 may not be easily inclined.

The mounting hole 114 which is formed at the rear side of the first plate portion 112 is an elongated hole formed in the rear end of the first plate portion 112, and the longitudinal axis direction thereof is formed along the longitudinal direction of the first plate portion 112.

Figure 13:
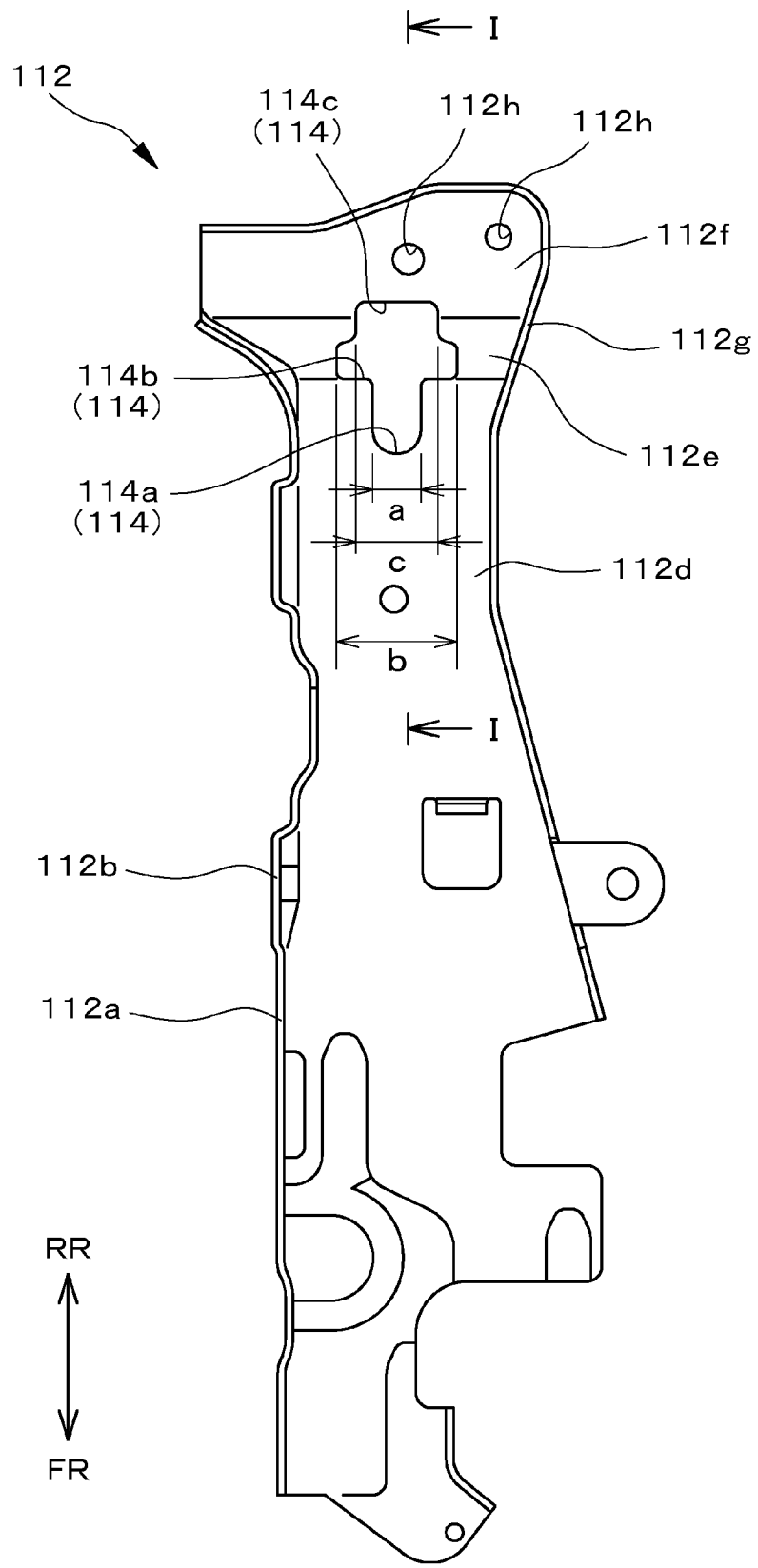
FIG. 13 is a plan view illustrating a first plate portion 112.

Then, as illustrated in FIG. 13, the mounting hole 114 has a configuration in which an intermediate portion 114b in the longitudinal direction has a width slightly larger than that of the front end 114a or the rear end 114c. More specifically, the mounting hole 114 is formed so that the width (the width indicated by a in FIG. 13) of the front end 114a is the smallest and the width increases in order of the width (the width indicated by c in FIG. 13) of the rear end 114c and the width (the width indicated by b in FIG. 13) of the intermediate portion 114b.

The intermediate portion 114b with the largest width is formed to have a width in which the washer Ws may pass through the intermediate portion. Further, the width of the rear end 114c is formed so that the head portion of the bolt Bo may pass through the rear end. Furthermore, the width of the front end 114a is formed so that the shaft portion of the bolt Bo may pass through the front end and the head portions of the washer Ws and the bolt Bo may not pass through the front end.

Accordingly, when the mounting hole 114 is formed so that the inner width becomes different as described above compared to the case where the mounting hole is formed by an elongated hole having a uniform inner width, the bolt Bo or the washer Ws may be inserted through the mounting hole and the mounting hole 114 (the first plate portion 112) may be locked while being trapped by the bolt Bo, the washer Ws, and the vehicle body floor 2. As a result, the first plate portion 112 may be easily assembled to the vehicle body floor 2.

Figure 14:
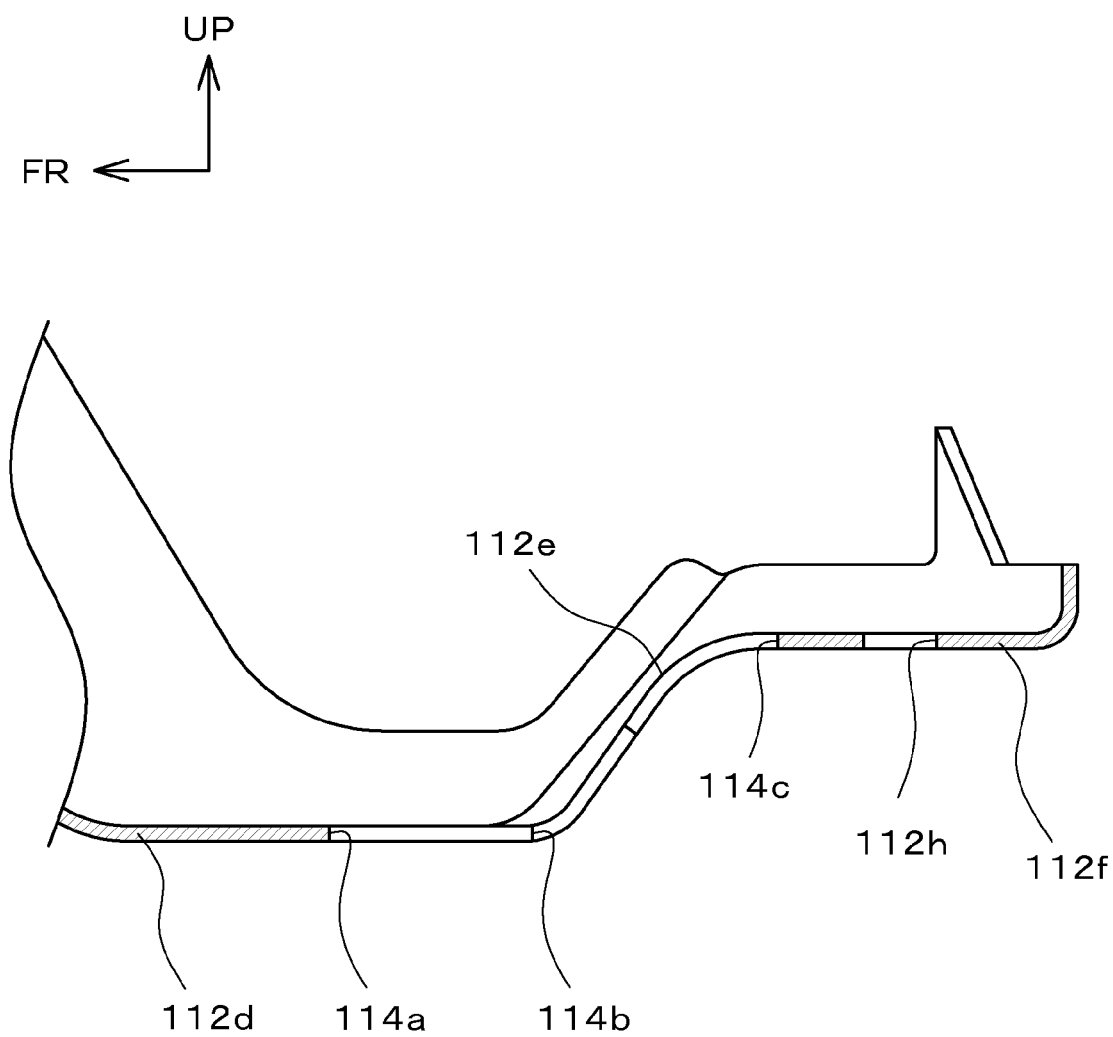
FIG. 14 is a cross-sectional side view corresponding to the line I-I of FIG. 13.

Then, as illustrated in FIG. 14, at least a part of the mounting hole 114 is formed in an inclined surface portion 112e which is bent to be formed upright from the mounting surface portion 112d mounted to the vehicle body floor 2 in a contact state. More specifically, the intermediate portion 114b having the largest width in the mounting hole 114 is formed to overlap the inclined surface portion 112e. Furthermore, a horizontal portion 112f which is formed to extend rearward relative to the inclined surface portion 112e is substantially formed into a horizontal plane.

In this way, since the intermediate portion 114b is formed to reach the inclined surface portion 112e, when the first plate portion 112 is slid on the vehicle body floor 2 toward the bolt Bo that protrudes upward in the substantially perpendicular direction from the vehicle body floor 2, the mounting hole 114 may engage with the bolt Bo.

Then, the front end 114a is formed in the mounting surface portion 112d, and when the shaft portion of the bolt Bo is inserted through an appropriate position of the front end 114a to be fastened thereto, the first plate portion 112 is attached to the vehicle body floor 2.

In the related art, a technique is frequently used in which the vehicle seat S11 (S1) is mounted to the bolt hole formed in advance in the vehicle body floor 2 through a bracket with a substantially circular hole. Then, at this time, since the vehicle seat S11 (S1) is a heavy-weight component, there are problems in which the vehicle seat may not be easily and accurately placed on the assembly position of the vehicle body floor 2 and the mounting operation may not be easily performed.

However, according to the mounting structure of the vehicle seat S11 (S1) of the seat disclosed herein, the position may be adjusted in a manner that the mounting plate 111 (the first plate portion 112) is placed and slid once while the mounting hole 114 is inserted through the bolt Bo and the washer Ws mounted onto the vehicle body floor 2. As a result, the assembling operation of the vehicle seat S11 (S1) may be easily performed.

Furthermore, since the seat cushion 10 (further, the mounting unit 110 and the movable unit 120) is attached in advance above the first plate portion 112, the first plate portion 112 is easily inclined forward by the load of the seat cushion 10 before the bolt Bo is fastened (the first plate portion 112 is just placed on the vehicle body floor 2). Accordingly, when the bolt Bo attached to the vehicle body floor 2 is inserted through the front end 114a of the mounting hole 114 to engage therewith, the first plate portion 112 may be prevented from being inclined forward. As a result, the positioning operation or the assembling operation with respect to the vehicle body floor 2 may be easily performed.

Moreover, the first plate portion 112 includes a flange 112g which is formed at the side thereof (more specifically, the side provided with the mounting hole 114) to be bent upward.

In this way, when the flange 112g is provided in the vicinity of the mounting hole 114, it is preferable that the rigidity in the vicinity of the mounting hole 114 is not degraded.

Further, since the first plate portion 112 is provided with not only the flange 112g but also the mounting surface portion 112d and the inclined surface portion 112e, the first plate portion 112 is formed into an uneven structure, and hence the rigidity of the first plate portion 112 with respect to the external force is improved. As a result, the high rigidity may be ensured when the first plate portion is assembled to the vehicle body floor 2.

Moreover, in the first plate portion 112, the width of the portion (the rear end) provided with the mounting hole 114 is larger than the width of the other portion (specifically, the mounting surface portion 112d). Then, the portion is provided with plural attachment holes 112h through which clips for attaching the cable C and the like are inserted.

In this way, when the width of the first plate portion 112 of the portion provided with the mounting hole 114 is large, it is possible to prevent the rigidity of the first plate portion 112 from being degraded by the mounting hole 114.

Moreover, since the attachment holes 112h are formed in the portion (primarily, the horizontal portion 112f) having a large width, the other component (for example, the cable C) provided in the vehicle seat S11 may be assembled. Accordingly, since the mounting hole 114 is provided at the rear end of the first plate portion 112 and the portion is formed with a large width, degradation in rigidity caused by the mounting hole 114 may be prevented and the other components may be appropriately arranged.

Furthermore, the first plate portion 112 is provided with the inclined surface portion 112e, but the horizontal portion 112f at the rear side thereof is formed to substantially extend in the horizontal direction while being separated from the vehicle body floor 2. Accordingly, since the portion (the horizontal portion 112f) at the rear side of the inclined surface portion 112e of the first plate portion 112 is disposed while being separated from the vehicle body floor 2 by a predetermined distance, a space for disposing the other component such as a clip is ensured. Accordingly, when the attachment hole 112h is formed in the rear end of the first plate portion 112, it is preferable that the space formed between the horizontal portion 112f and the vehicle body floor 2 is efficiently used by the inclined surface portion 112e.

First Embodiment

Figure 16:
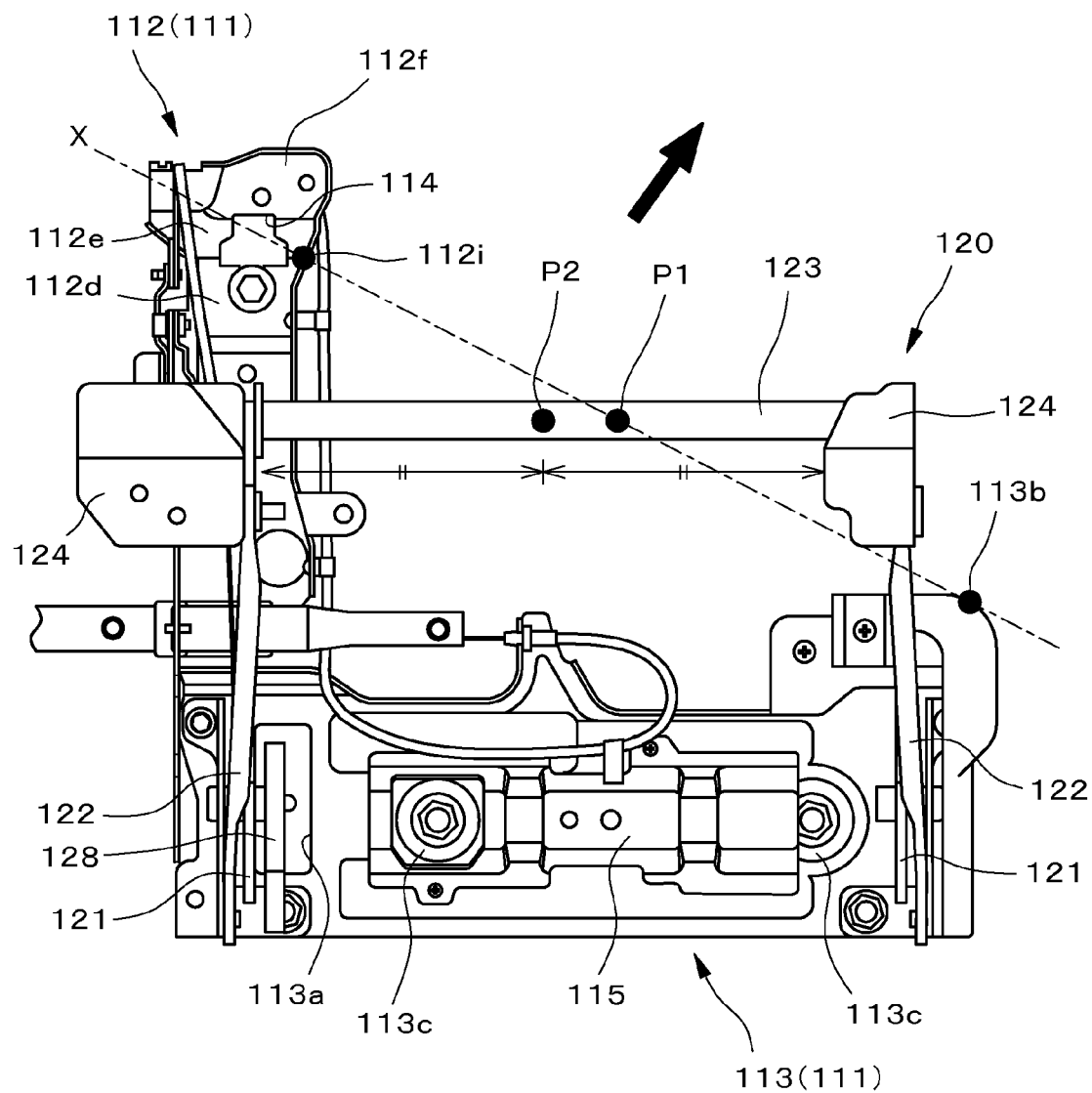
FIG. 16 is a plan view explanatory diagram illustrating a mounting unit 110 according to the first embodiment.

Hereinafter, a first embodiment involved with the configurations of the first plate portion 112, the second plate portion 113, and the connection bar 123 will be described by referring to FIG. 16. Furthermore, in the state of the plan view (FIG. 16), the apex at the inside (the right side of FIG. 16) in the seat width direction of the rear end of the mounting surface portion 112d of the first plate portion 112 is set as a first apex 112i and the rear end (the rear apex) at the end that does not overlap (does not intersect) the first plate portion 112 in the second plate portion 113 is set as a second apex 113b. Furthermore, the first apex 112i and the second apex 113b are points where loads are most likely applied in the first plate portion 112 and the second plate portion 113 when the occupant sits on the vehicle seat.

In the first embodiment, each of the first plate portion 112 and the second plate portion 113 is substantially formed in a rectangular shape. Then, a center portion P2 of the connection bar 123 in the extension direction is disposed at a position close to the first plate portion 112 relative to an intersection point P1 between the connection bar 123 (more specifically, the center axis of the connection bar 123) and the imaginary line (the line X in FIG. 16) connecting the first apex 112i and the second apex 113b. That is, the intersection point P1 is disposed nearer the end of the second plate portion 113 that does not overlap the first plate portion 112 compared to the center portion P2. In other words, the intersection point P1 is provided near the second apex 113b relative to the center portion P2.

In this way, since the intersection point P1 is disposed at a position far from the mounting plate 111 (the first plate portion 112) relative to the center portion P2 of the connection bar 123 as the position involved with the maximum load generated when the occupant sits on the vehicle seat, the load balance of the seat cushion 10 may be easily obtained, and hence the movable unit 120 may not be easily inclined.

That is, since the center point (the center portion P2) of the pair of mounting brackets 124 supporting the seat cushion 10 is disposed nearer the first plate portion 112 compared to the intersection point P1, it is possible to easily support the load of the occupant applied to the seat cushion 10.

Second Embodiment

Moreover, a second embodiment will be described by referring to FIG. 17. The second embodiment has a characteristic point in which a second plate portion 213 is formed in an L-shape in the plan view differently from the first embodiment in which the second plate portion 113 is substantially formed in a rectangular shape. Further, since the other points (the shapes and the arrangement of the components) are the same as those of the first embodiment, the description thereof will not be repeated.

The second plate portion 213 includes a rearward extension portion 213a which is provided at the end of the second plate portion opposite to the end overlapping the first plate portion 112. The extension portion 213a is provided to extend in parallel to the extension direction of the first plate portion 112, and is formed by a planar plate member. The length of the extension portion 213a in the front to back direction is substantially the half of the length of the first plate portion 112 in the front to back direction.

Then, as in the first embodiment, the center portion P2 of the connection bar 123 in the extension direction is disposed at a position close to the first plate portion 112 relative to the intersection point P1 between the connection bar 123 and the imaginary line (the line X in FIG. 17) connecting the first apex 112i and a second apex 213b (the second apex 213b indicates the apex which is the rear end of the extension portion 213a and is located at the outside in the seat width direction). That is, the intersection point P1 is disposed at the end that does not overlap the first plate portion 112 in the second plate portion 213 relative to the center portion P2. In other words, the intersection point P1 is provided near the second apex 213b relative to the center portion P2.

In this way, when the second plate portion 213 is provided with the extension portion 213a, the portion (that is, the area where the first plate portion 112, the second plate portion 213, and the extension portion 213a contact the vehicle body floor 2) fixed to the vehicle body floor 2 is larger than the first embodiment and the intersection point P1 is separated from the first plate portion 112. Accordingly, the stability is further improved and hence the movable unit 120 provided at the upper position is not easily inclined.

Figure 17:
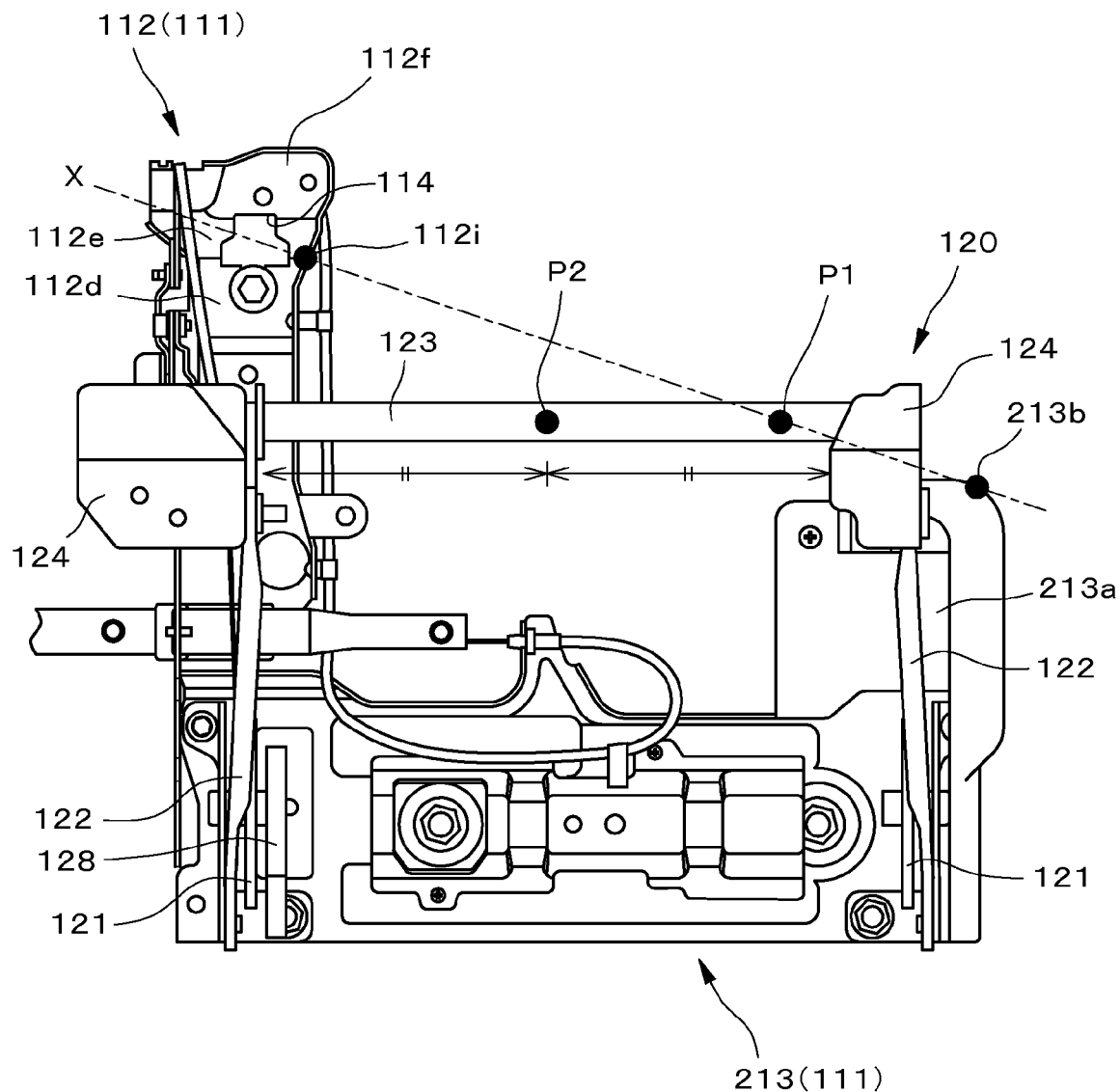
FIG. 17 is a plan view explanatory diagram illustrating the mounting unit 110 according to a second embodiment.

Furthermore, in FIG. 17, a configuration is illustrated in which the extension portion 213a is integrally formed with the second plate portion 213 extending in the seat width direction, but the extension portion may be formed by a separate member. When the extension portion 213a is formed separately from the second plate portion 213, one end of the extension portion 213a may be disposed below the second plate portion 213 extending in the seat width direction (see a third embodiment below). In this way, when the extension portion 213a is interposed between the second plate portion 213 and the vehicle body floor 2, the first plate portion 112 is disposed below the other end of the second plate portion 213 and the second plate portion 213 is disposed horizontally, thereby stabilizing the extension portion.

Third Embodiment

Figure 18:
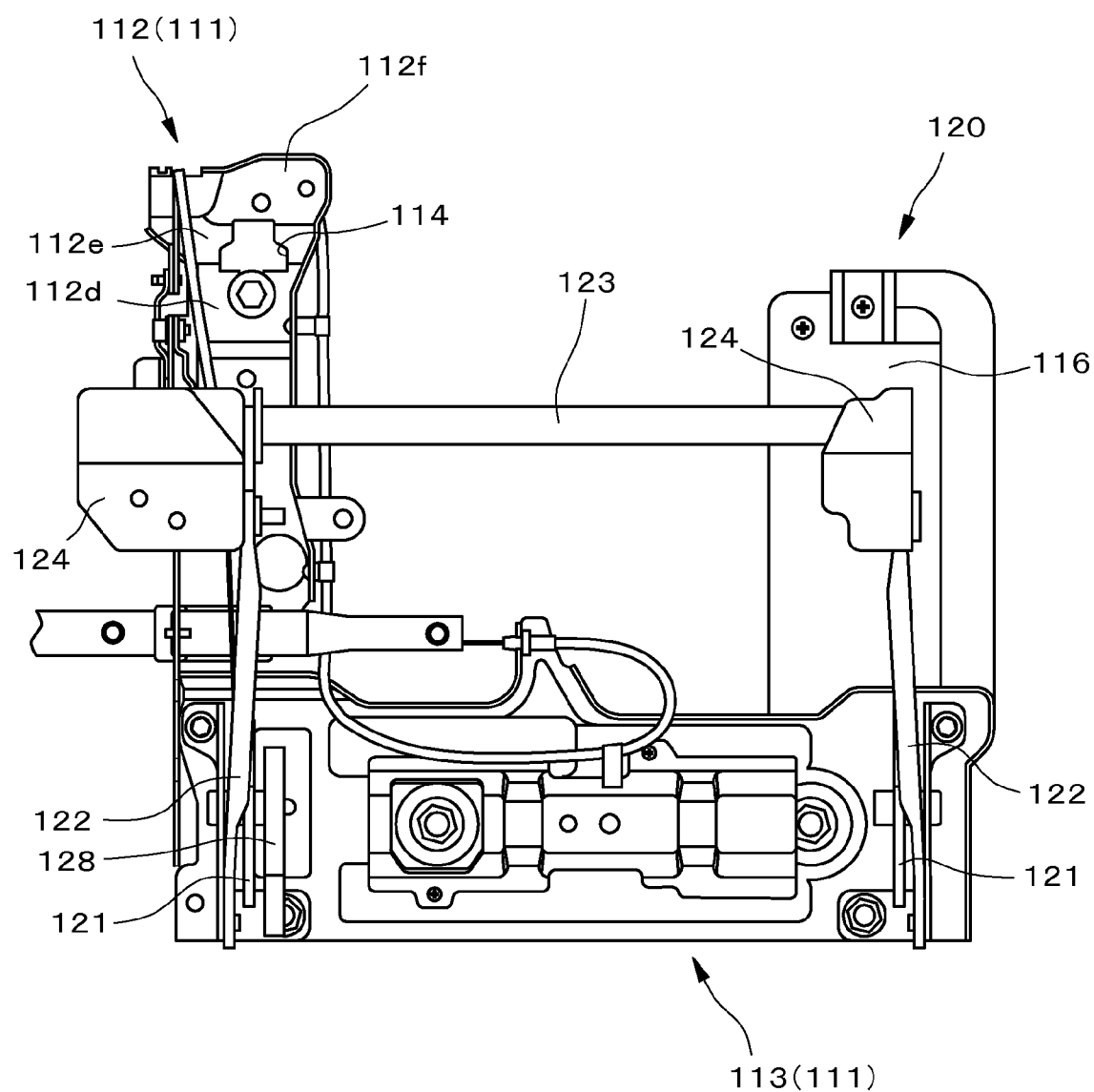
FIG. 18 is a plan view explanatory diagram illustrating the mounting unit 110 according to a third embodiment.

Hereinafter, a third embodiment will be described by referring to FIG. 18. The third embodiment has a characteristic point in which a third plate portion 116 is further provided differently from the first embodiment in which the first plate portion 112 and the second plate portion 113 each having a substantially rectangular shape are combined in an L-shape in the plan view. Further, since the other points (the shapes and the arrangement of the components) are the same as those of the first embodiment, the description thereof will not be repeated.

The third plate portion 116 substantially extends in parallel to the first plate portion 112, and substantially has the same length as that of the first plate portion 112. Then, the first plate portion 112 and the third plate portion 116 substantially having the same width are disposed to overlap both ends of the second plate portion 113 substantially formed in a rectangular shape. Accordingly, the first plate portion 112, the second plate portion 113, and the third plate portion 116 are substantially combined in a U-shape in the plan view.

It is preferable to dispose the third plate portion 116 so that the front end thereof is located below the second plate portion 113 and the second plate portion 113 is held horizontally as in the first plate portion 112, but the third plate portion 116 and the second plate portion 113 may be integrally formed with each other. When both plate portions are integrally formed with each other, the number of components decreases, and hence the assembling workability is improved.

In this way, since the first plate portion 112, the second plate portion 113, and the third plate portion 116 are substantially combined in a symmetric U-shape in the plan view in the right and left direction (the seat width direction), the link 121, the pipe rod 122, and the like disposed above the first plate portion 112, the second plate portion 113, and the third plate portion 116 may be stably held.

Fourth Embodiment

Figure 19:
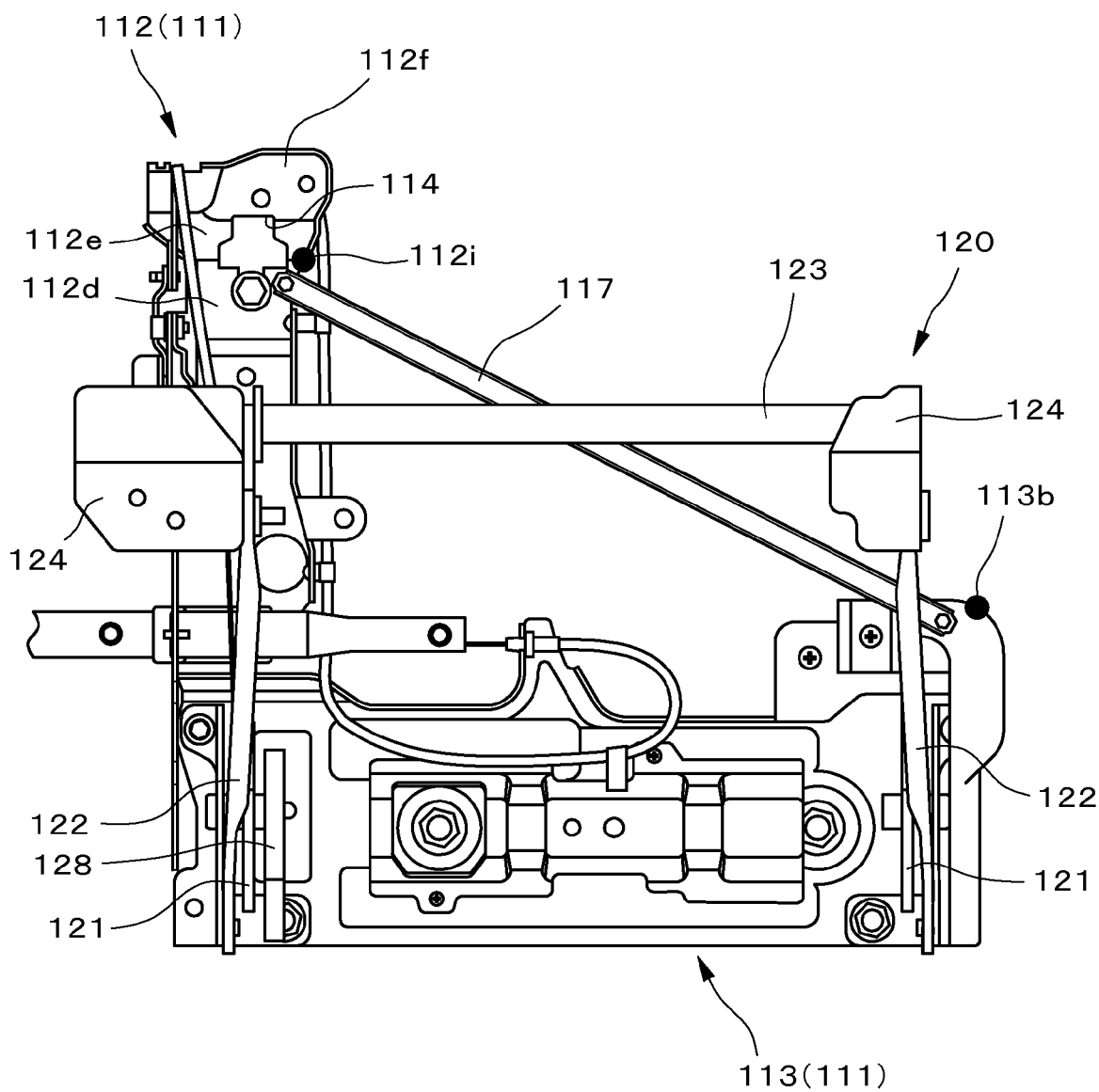
FIG. 19 is a plan view explanatory diagram illustrating the mounting unit 110 according to a fourth embodiment.

Moreover, a fourth embodiment will be described by referring to FIG. 19. The fourth embodiment has a characteristic point in which the connection frame 117 connecting both ends of the first plate portion 112 and the second plate portion 113 is further provided in addition to the first embodiment in which the first plate portion 112 and the second plate portion 113 each having a substantially rectangular shape are combined in an L-shape in the plan view. Further, since the other points (the shapes and the arrangement of the components) are the same as those of the first embodiment, the description thereof will not be repeated.

The connection frame 117 is a component that connects the first apex 112i and the second apex 113b of the first embodiment, and is provided to improve the rigidity of the first plate portion 112 and the second plate portion 113. The connection frame 117 is installed between the rear end of the first plate portion 112 and the end opposite to the end overlapping the first plate portion 112 in the second plate portion 113.

Figure 20:
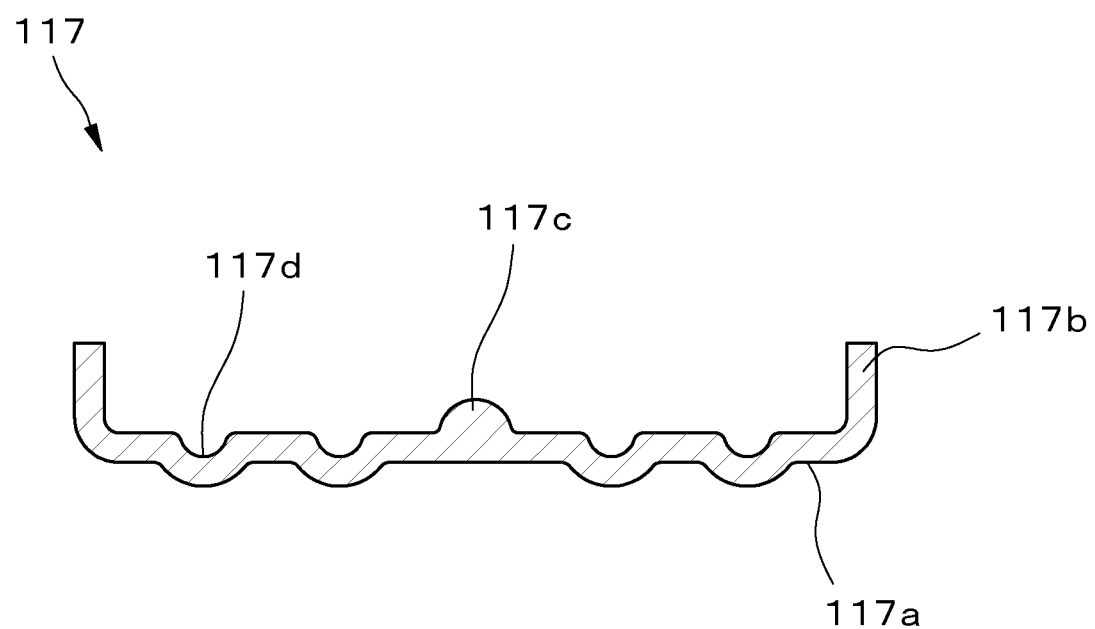
FIG. 20 is a cross-sectional view illustrating a connection frame 117.

The connection frame 117 is formed by a metallic or resinous elongated member, and is formed by a plate member having a U-shaped cross-section and including a bottom surface 117a and a side wall 117b as illustrated in FIG. 20. Then, a bead 117c is formed in the bottom surface 117a in the extension direction to improve the rigidity of the connection frame 117.

Moreover, plural grooves 117d are formed in the bottom surface 117a in the extension direction of the bead 117c. In this way, when the bottom surface 117a of the connection frame 117 is formed in an uneven shape, the rigidity of the connection frame 117 may be improved. Furthermore, in order to improve the rigidity of the connection frame 117, the connection frame 117 may be formed into a hollow structure (closed section structure).

The connection frame 117 is disposed so that the bottom surface 117a faces the downside when the connection frame 117 is installed in the first plate portion 112 and the second plate portion 113. Then, both ends of the bottom surface 117a are respectively fixed to the first plate portion 112 and the second plate portion 113 (further, the vehicle body floor 2) by lock members.

In this way, when the respective ends of the first plate portion 112 and the second plate portion 113 substantially formed in an L-shape in the plan view are connected by the connection frame 117, a substantially triangular shape is formed in the plan view as a whole, and hence the rigidity of the mounting unit 110 is further improved. Then, since the rigidity of the mounting unit 110 is improved, the mounting unit 110 is strongly fixed to the vehicle body floor 2. Accordingly, it is possible to suppress the inclination of the movable unit 120 provided above the mounting unit 110.

Fifth Embodiment

Figure 21:
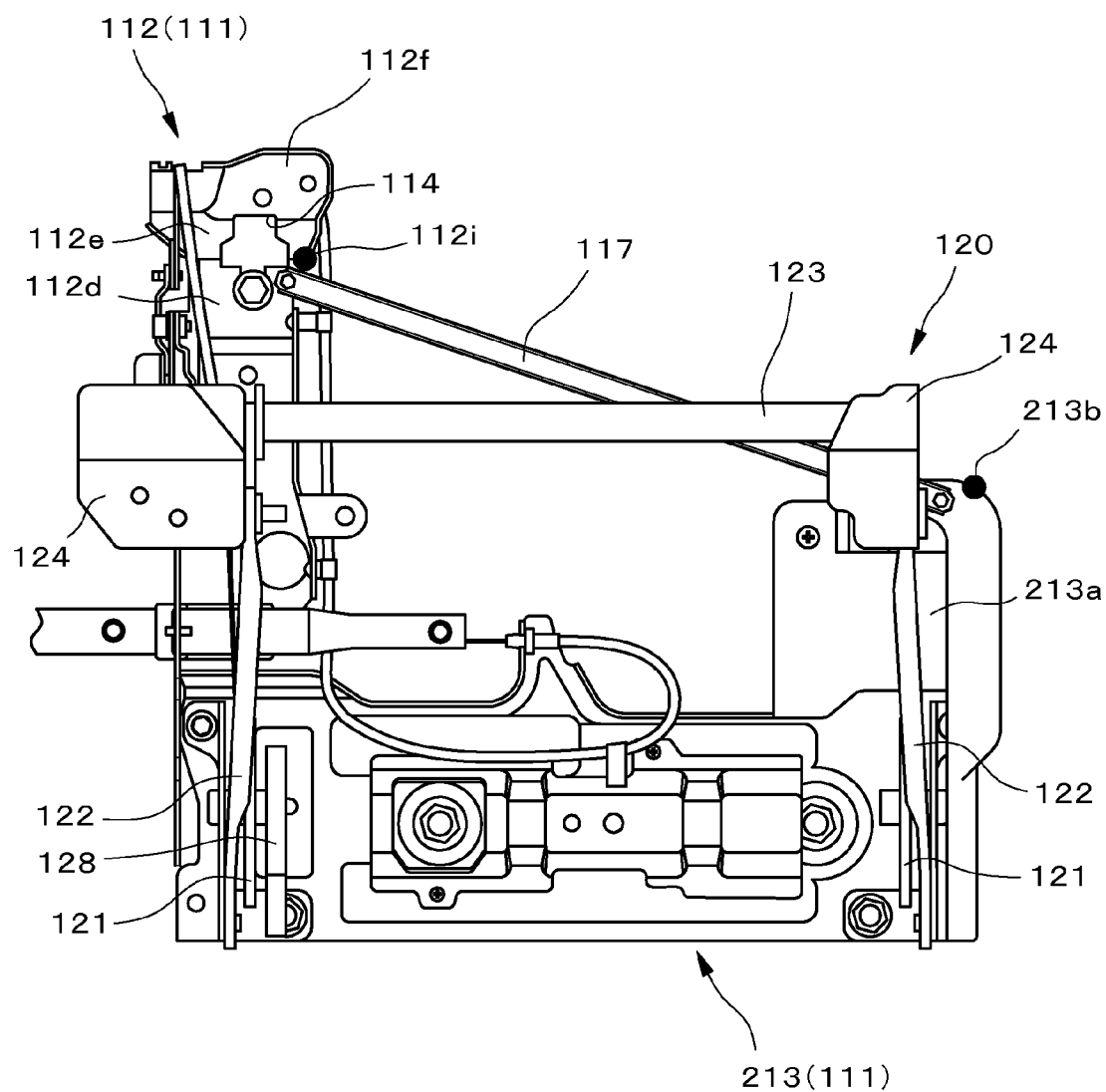
FIG. 21 is a plan view explanatory diagram illustrating the mounting unit 110 according to a fifth embodiment.

Moreover, a fifth embodiment will be described by referring to FIG. 21. The fifth embodiment has a characteristic point in which the connection frame 117 connecting the respective ends of the first plate portion 112 and the second plate portion 213 is further provided in addition to the second embodiment in which the first plate portion 112 substantially having a rectangular shape and the second plate portion 213 substantially having an L-shape are combined. Furthermore, since the other points (the shapes and the arrangement of the components) are the same as those of the above-described embodiment, the description thereof will not be repeated.

The connection frame 117 is disposed to connect the first apex 112i and the second apex 213b. More specifically, the connection frame 117 is installed between the rear end of the first plate portion 112 and the rear end of the extension portion 213a. With this configuration, the rigidity of the first plate portion 112 and the second plate portion 213 may be improved.

In this way, when the connection frame 117 is installed between the first plate portion 112 and the extension portion 213a, a substantially trapezoid shape is formed in the plan view as a whole, and hence the rigidity of the first plate portion 112 and the extension portion 213a may be further improved. Accordingly, the mounting unit 110 is strongly attached to the vehicle body floor 2. As a result, the inclination of the movable unit 120 may be prevented.

Sixth Embodiment

Figure 22:
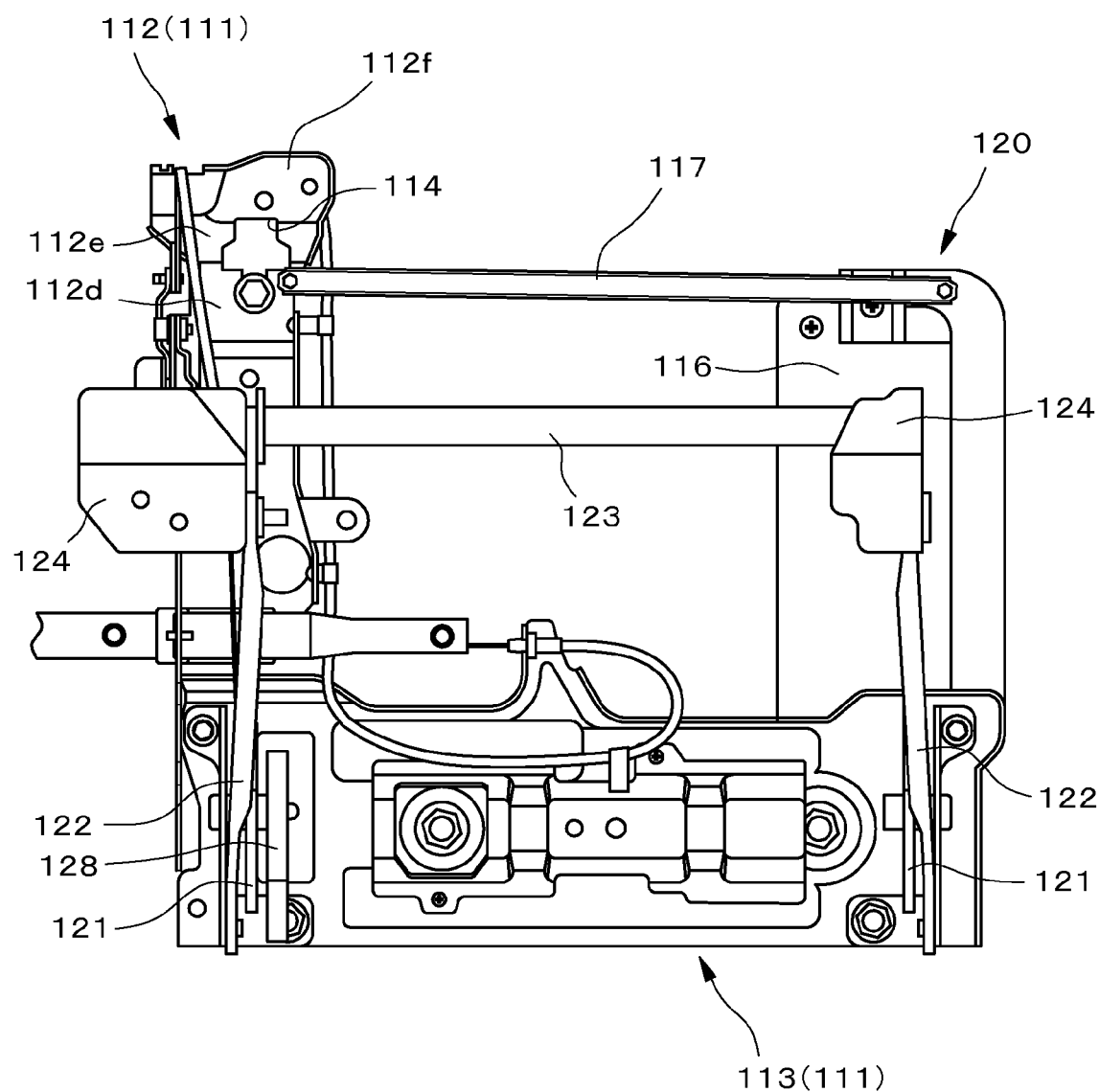
FIG. 22 is a plan view explanatory diagram illustrating the mounting unit 110 according to a sixth embodiment.

Further, a sixth embodiment will be described by referring to FIG. 22. The sixth embodiment has a characteristic point in which the connection frame 117 connecting the respective ends of the first plate portion 112 and the third plate portion 116 is further provided in addition to the third embodiment in which the first plate portion 112, the second plate portion 113, and the third plate portion 116 each having a substantially rectangular shape are combined. Furthermore, since the other points (the shapes and the arrangement of the components) are the same as those of the above-described embodiment, the description thereof will not be repeated.

The connection frame 117 is disposed to connect the respective rear ends of the first plate portion 112 and the third plate portion 116. In other words, the connection frame 117 is substantially provided to be parallel to the extension direction of the second plate portion 113 and the connection bar 123. More specifically, the connection frame 117 is installed between the rear end of the first plate portion 112 and the rear end of the third plate portion 116. With this configuration, the rigidity of the first plate portion 112, the second plate portion 113, and the third plate portion 116 may be improved.

In this way, when the connection frame 117 is installed between the first plate portion 112 and the third plate portion 116, the mounting unit 110 is substantially formed in a rectangular shape in the plan view as a whole, and hence the rigidity of the first plate portion 112 and the third plate portion 116 may be further improved. Accordingly, the mounting unit 110 is strongly attached to the vehicle body floor 2. As a result, the inclination of the movable unit 120 may be prevented.

The Cover 200 of the Seat Cushion Flip-Up Mechanism 60

Figure 23:
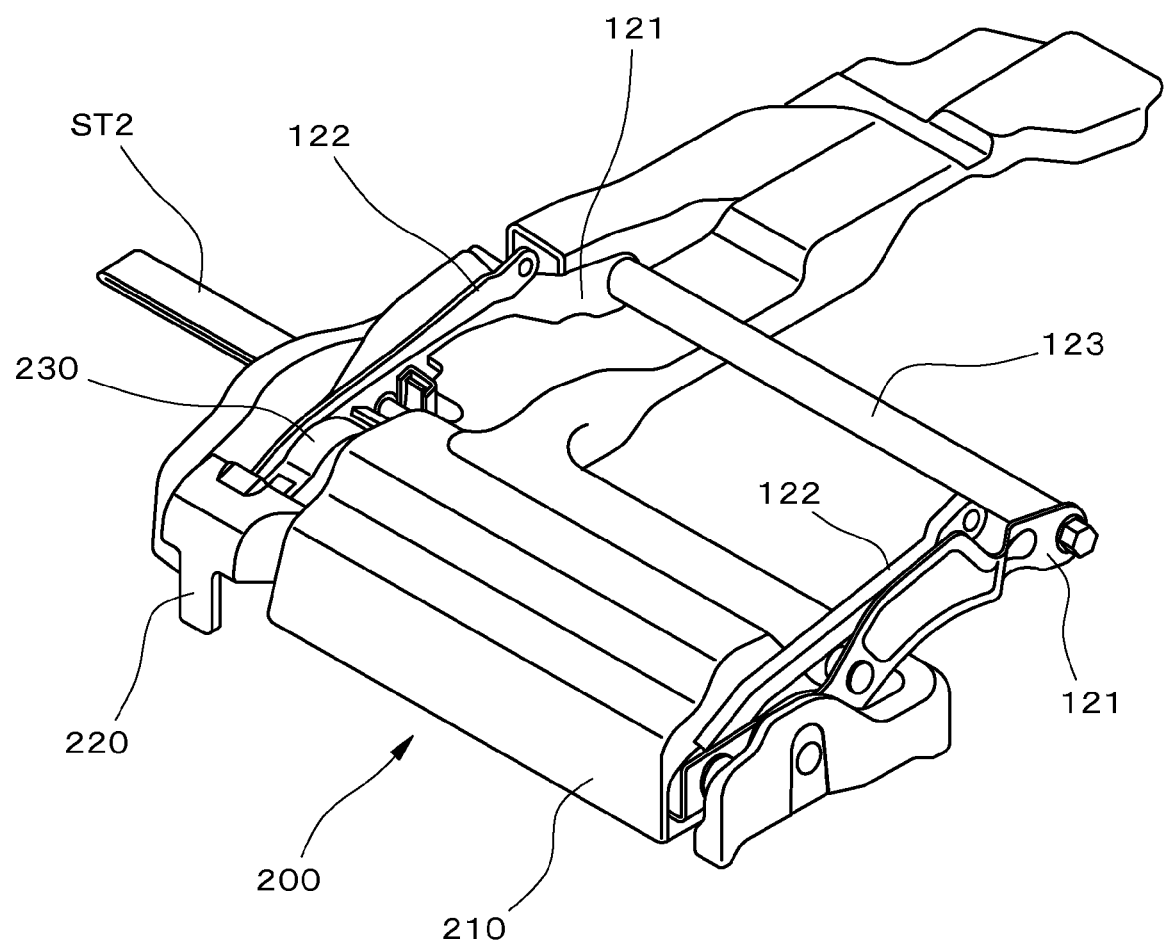
FIG. 23 is a schematic front perspective view illustrating the seat cushion flip-up mechanism 60.

Next, the cover 200 of the seat cushion flip-up mechanism 60 will be described. As illustrated in FIG. 23, the cover 200 covers the seat cushion flip-up mechanism 60, and, in this embodiment, is particularly a cover member that covers the support mechanism 125 of the movable unit 120 or the mounting unit 110. The cover 200 includes a cover body 210 which forms most of the cover 200, a spiral spring cover member 220 that is provided at the end (the end provided with the spiral spring 128) located at the outside of the vehicle 1 in the right and left direction of the vehicle 1, and a link side cover member 230 that is mounted to the side of the link 121 located at the outside of the vehicle 1.

The cover body 210 is a member that is formed of a thermosetting resin such as plastic and is substantially formed in an L-shape in the top view to cover the support mechanism 125 of the movable unit 120 or the mounting unit 110. In the cover body 210, a portion corresponding to the movable range of the link 121 or the pipe rod 122 is provided with a slit, and the cover body is formed to not interfere with the rotation of the link 121 or the pipe rod 122.

Furthermore, the rear surface of the cover body 210 is provided with a positioning protrusion (not illustrated), and the positioning protrusion is adapted to be fittable to the positioning hole 115c of the submarine bracket 115 described above. In other words, the positioning protrusion is formed uprightly at a portion corresponding to the positioning hole 115c of the submarine bracket 115 in the rear surface of the cover body 210. Then, when the positioning protrusion is fitted to the positioning hole 115c, the cover body 210 is positioned to the regular setting position.

Figure 24:
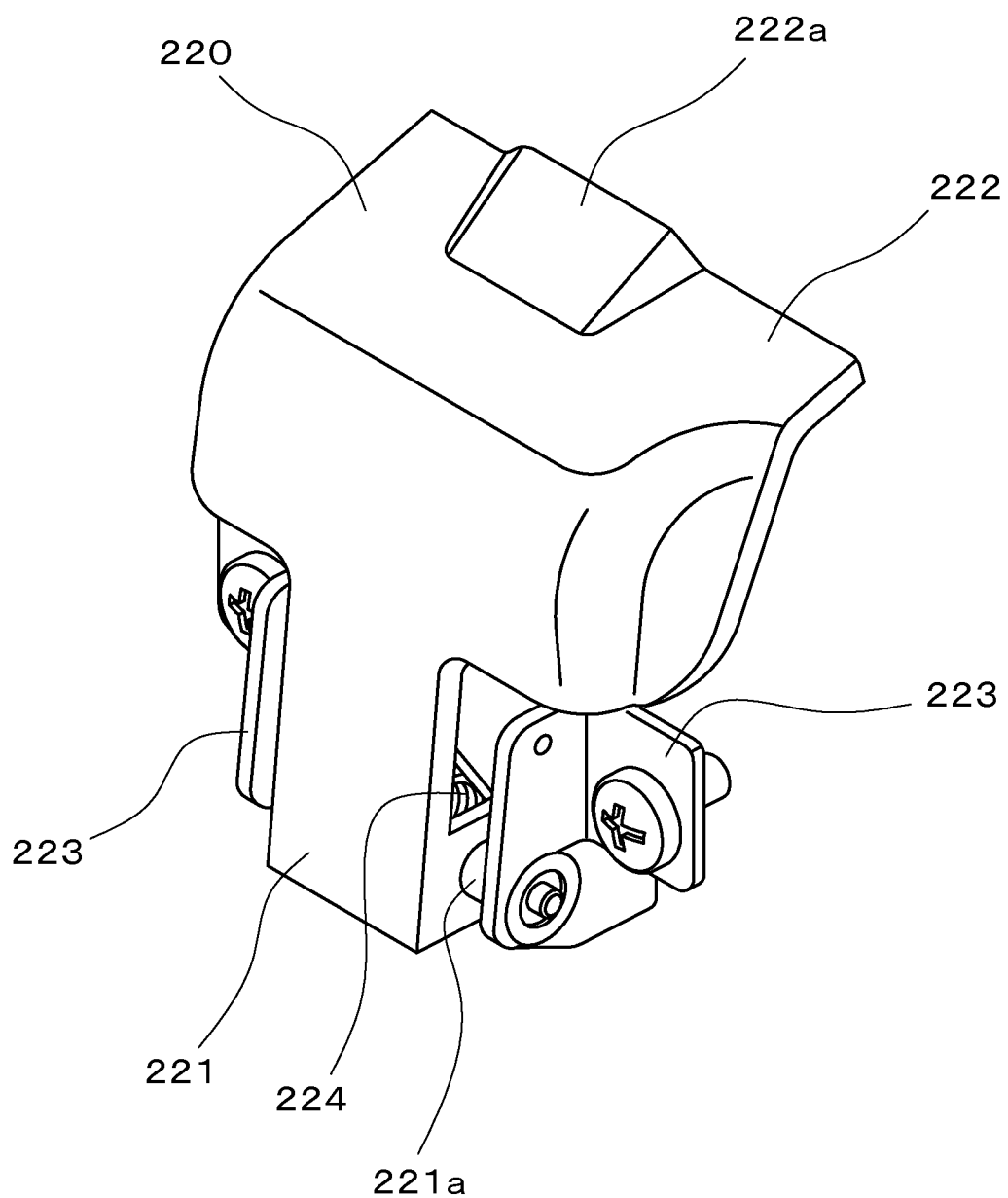
FIG. 24 is a front perspective view illustrating a spiral spring cover member 220.

The spiral spring cover member 220 is an example of the biasing member cover portion and is located at the front side of the spiral spring 128 inside the slit, formed to not disturb the rotation of the link 121 or the pipe rod 122 in the cover body 210, to cover the spiral spring 128. As illustrated in FIG. 24, the spiral spring cover member 220 includes a base portion 221 which is supported by the vehicle body floor 2 and a main body portion 222 which covers the spiral spring 128. The base portion 221 corresponds to the lower portion of the spiral spring cover member 220, and is supported by the cover mounting bracket 223 fixed to the vehicle body floor 2. Particularly, in this embodiment, a shaft 221a that protrudes from the side portion of the base portion 221 is fitted to a shaft hole (not illustrated) formed in the cover mounting bracket 223. Accordingly, the spiral spring cover member 220 is rotatable in the front to back direction.

Furthermore, a spring 224, as an example of the biasing spring, is provided at the rear side of the base portion 221, one end of the spring 224 being locked to the base portion 221, and the other end thereof being locked to the cover mounting bracket 223. The spring 224 biases the spiral spring cover member 220 rearward so that the posture of the spiral spring cover member 220 is held continuously at the standing posture (the posture of the spiral spring cover member 220 illustrated in FIG. 25).

Figure 25:
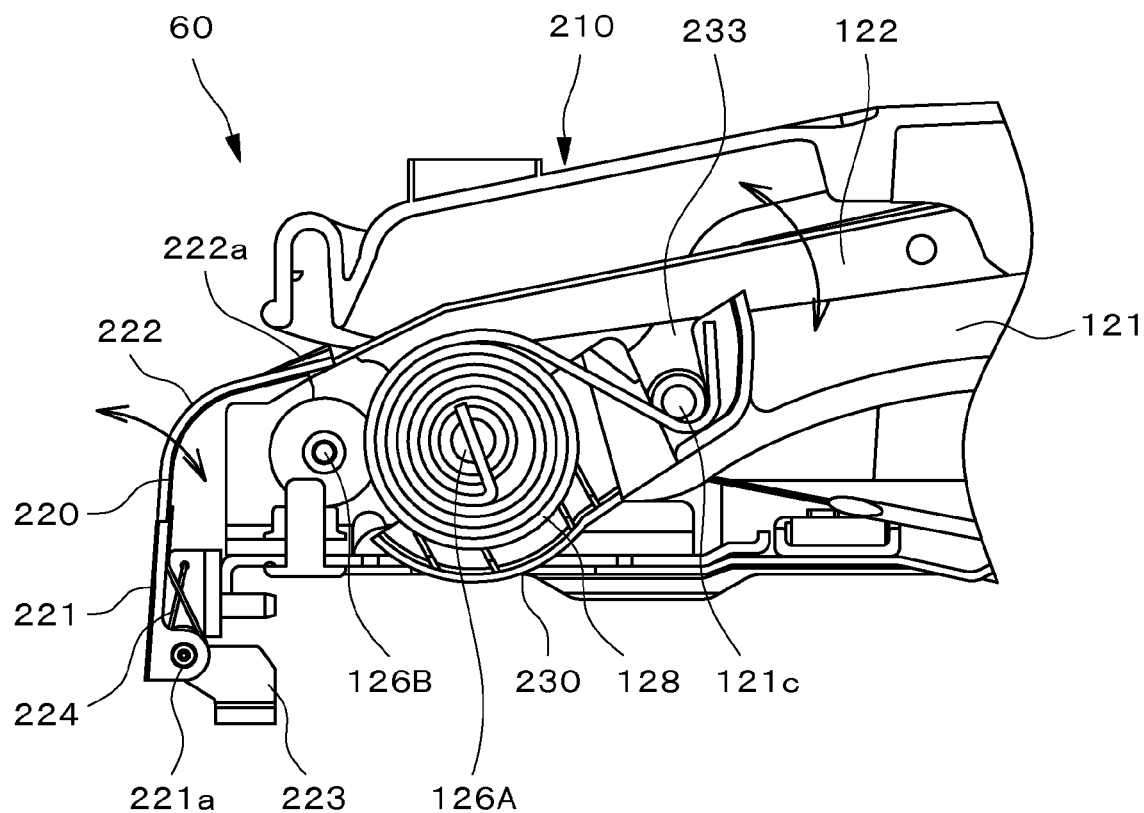
FIG. 25 is a cross-sectional side view illustrating a cover 200 and the seat cushion flip-up mechanism 60.

The main body portion 222 corresponds to the upper portion of the spiral spring cover member 220, has a width slightly larger than that of the base portion 221, and is substantially curved in a circular-arc shape in the side view. The main body portion 222 covers the spiral spring 128 at the front position of the spiral spring 128 when the posture of the spiral spring cover member 220 is held at the standing posture. Further, as illustrated in FIG. 25, a portion substantially located at the center of the upper end of the main body portion 222 in the width direction forms a bulging portion 222a which slightly bulges forward. The bulging portion 222a is formed so that its front surface becomes an inclined surface.

Then, when the link 121 rotates forward during the flip-up operation, the spiral spring cover member 220 contacts the link 121 (more specifically, the link 121 located at the outside of the vehicle 1) at the bulging portion 222a, and is pressed forward by the link 121 after the contacting operation. As a result, the spiral spring cover member 220 moves along with the forward rotation of the link 121, and rotates to be inclined forward.

That is, in this embodiment, the link 121 contacts the spiral spring cover member 220 during the forward rotation. Here, when the forward direction is set as a first direction and the rearward direction is set as a second direction in the rotation direction (that is, the front to back direction) of the spiral spring cover member 220, the spring 224 biases the spiral spring cover member 220 in the second direction. When the link 121 rotates forward while contacting the spiral spring cover member 220, the link presses the spiral spring cover member 220 in the first direction so that the spiral spring cover member 220 is rotated forward against the biasing force of the spring 224.

As described above, the spiral spring cover member 220 according to the embodiment covers the spiral spring 128 before the seat cushion 10 is flipped up (in other words, while the seat cushion is held at the sitting position) by the main body portion 222 and is inclined forward along with the forward rotation of the link 121 during the flip-up operation. In this way, in this embodiment, since the spiral spring cover member 220 is inclined forward while being interlocked with (following) the forward rotation of the link 121, the spiral spring cover member 220 does not disturb the forward rotation of the link 121.

Moreover, in this embodiment, when the link 121 contacts the spiral spring cover member 220 during the forward rotation and the link 121 further rotates forward while contacting the spiral spring cover member 220, the spiral spring cover member 220 is pressed forward so that the spiral spring cover member 220 is rotated forward against the biasing force of the spring 224. As a result, it is possible to improve the following ability of the spiral spring cover member 220 with respect to the forward rotation of the link 121. Further, since the spiral spring cover member 220 is automatically inclined by the forward rotation of the link 121 and is automatically returned to the original position when the pressing operation using the link 121 is canceled, the operability of the spiral spring cover member 220 becomes satisfactory.

Furthermore, in this embodiment, the spiral spring cover member 220 includes the bulging portion 222a formed at the main body portion 222 and contacts the link 121 by the bulging portion 222a. Accordingly, the spiral spring cover member 220 may be appropriately inclined forward. Specifically, since the contact portion (that is, the bulging portion 222a) of the spiral spring cover member 220 with respect to the link 121 is slightly shifted to the front side relative to the other portion, it is possible to prevent a problem in which the link 121 and the spiral spring cover member 220 contact by mistake to carelessly incline the spiral spring cover member 220. Further, since the bulging portion 222a is formed, the rigidity of the spiral spring cover member 220 is also improved.

Figure 26:
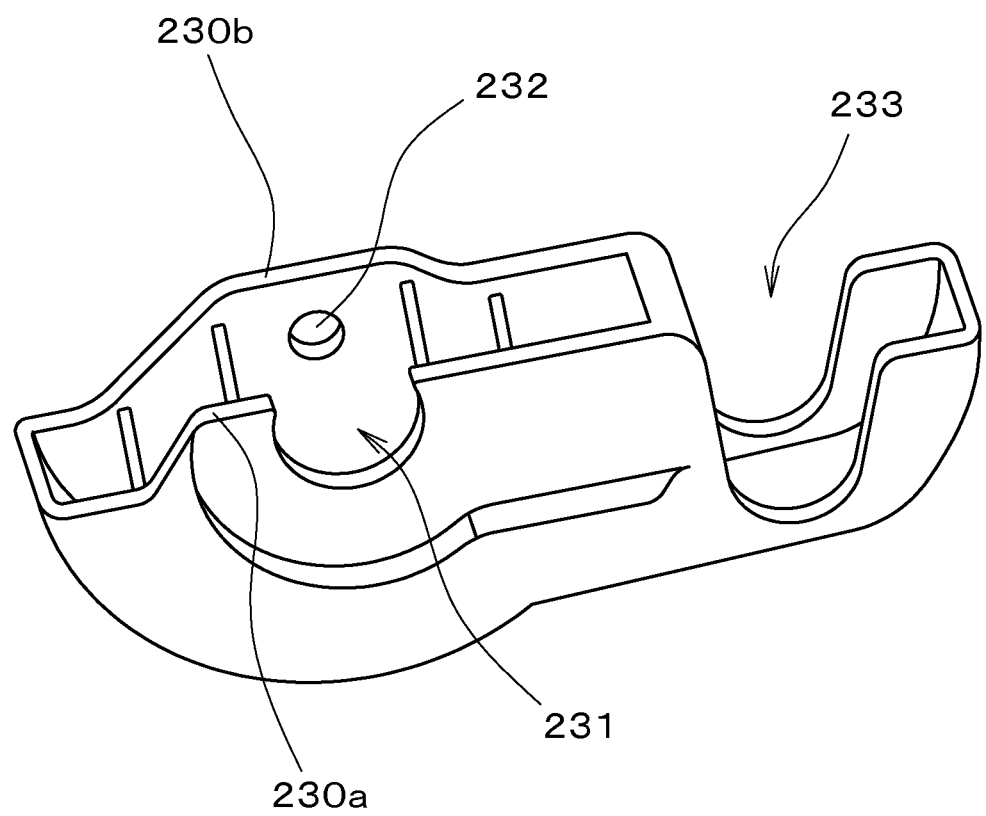
FIG. 26 is a perspective view illustrating a link side cover member 230.

The link side cover member 230 is another example of the biasing member cover portion, and is used to cover the spiral spring 128 at the side of the link 121 (the link 121 located at the outside of the vehicle 1) inside the slit which is formed to not disturb the rotation of the link 121 or the pipe rod 122 in the cover body 210. As illustrated in FIG. 26, the link side cover member 230 has a semi-oval shape, and is rotatably supported by the rotation shaft 126A of the link 121. That is, in this embodiment, the rotation shaft of the link side cover member 230 is the same as the rotation shaft 126A of the link 121. Then, when the link 121 rotates forward, the link side cover member 230 rotates along with the link 121.

More specifically, the link side cover member 230 includes a pair of side portions 230a and 230b which is disposed in series with a gap therebetween, where one side portion 230a is located between the link 121 and the spiral spring 128, and the other side portion 230b is located at the side (the side opposite to the link 121) of the spiral spring 128. In other words, the link side cover member 230 is set so that the spiral spring 128 is located in a gap between the pair of side portions 230a and 230b.

Further, as illustrated in FIG. 26, the side portion 230a which is located between the link 121 and the spiral spring 128 is provided with a semi-circular notch 231. When the notch 231 is fitted to the rotation shaft 126A of the link 121, the link side cover member 230 is supported by the same rotation shaft 126A. Further, as illustrated in FIG. 26, one end of the link side cover member 230 is provided with a recess 233, and the protrusion 121f protruding from the side surface of the link 121 is fitted into the recess 233 (see FIG. 25).

By the above-described configuration, the link side cover member 230 is integrated with the link 121 through the rotation shaft 126A. Then, when the rotation shaft 126A rotates, the link 121 rotates along with the rotation.

Then, the link side cover member 230 surrounds the lower side of the spiral spring 128 (see FIG. 25) before the seat cushion 10 is flipped up (when the seat cushion is held at the sitting position). When the link 121 rotates forward by the flip-up operation, the link side cover member rotates along with the link 121 and moves to a position where the upside of the spiral spring 128 is surrounded. At this time, the spiral spring cover member 220 is pressed by the link 121 to be inclined forward. That is, when the spiral spring cover member 220 is inclined forward along with the flip-up operation of the seat cushion 10, the link side cover member 230 covers the spiral spring 128 instead of the spiral spring cover member 220. Further, in this embodiment, since the component that covers the spiral spring 128 instead of the spiral spring cover member 220 is integrated with the link 121, the size of the cover member (the biasing member cover portion) may be further decreased.

Furthermore, in the pair of side portions 230a and 230b provided in the link side cover member 230, the side portion 230b which is located at the side of the spiral spring 128 and is located at the attachment side of the link 121 is provided with a peephole 232 which is provided at a position facing the notch 231. The peephole 232 is a hole that is used to check the spiral spring 128 disposed between the side portions 230a and 230b, and since the peephole 232 is formed, the mounting state of the spiral spring 128 may be easily checked.

As described above, in this embodiment, the seat cushion flip-up mechanism 60 is covered by the cover 200, and particularly the spiral spring 128 is covered by the spiral spring cover member 220 or the link side cover member 230 in the periphery of the rotation support point of the rotating link 121. Accordingly, it is possible to prevent trash or dust from adhering to and settling around the rotation support point of the link 121. Particularly, in this embodiment, as described above, the spiral spring cover member 220 covers the spiral spring 128 before the seat cushion 10 is flipped up. Then, when the seat cushion 10 is flipped up to the flip-up position, the link side cover member 230 covers the spiral spring 128. That is, in this embodiment, even when the position of the seat cushion 10 is held at any one of the sitting position and the flip-up position, the spiral spring 128 is appropriately covered.

Figure 27:
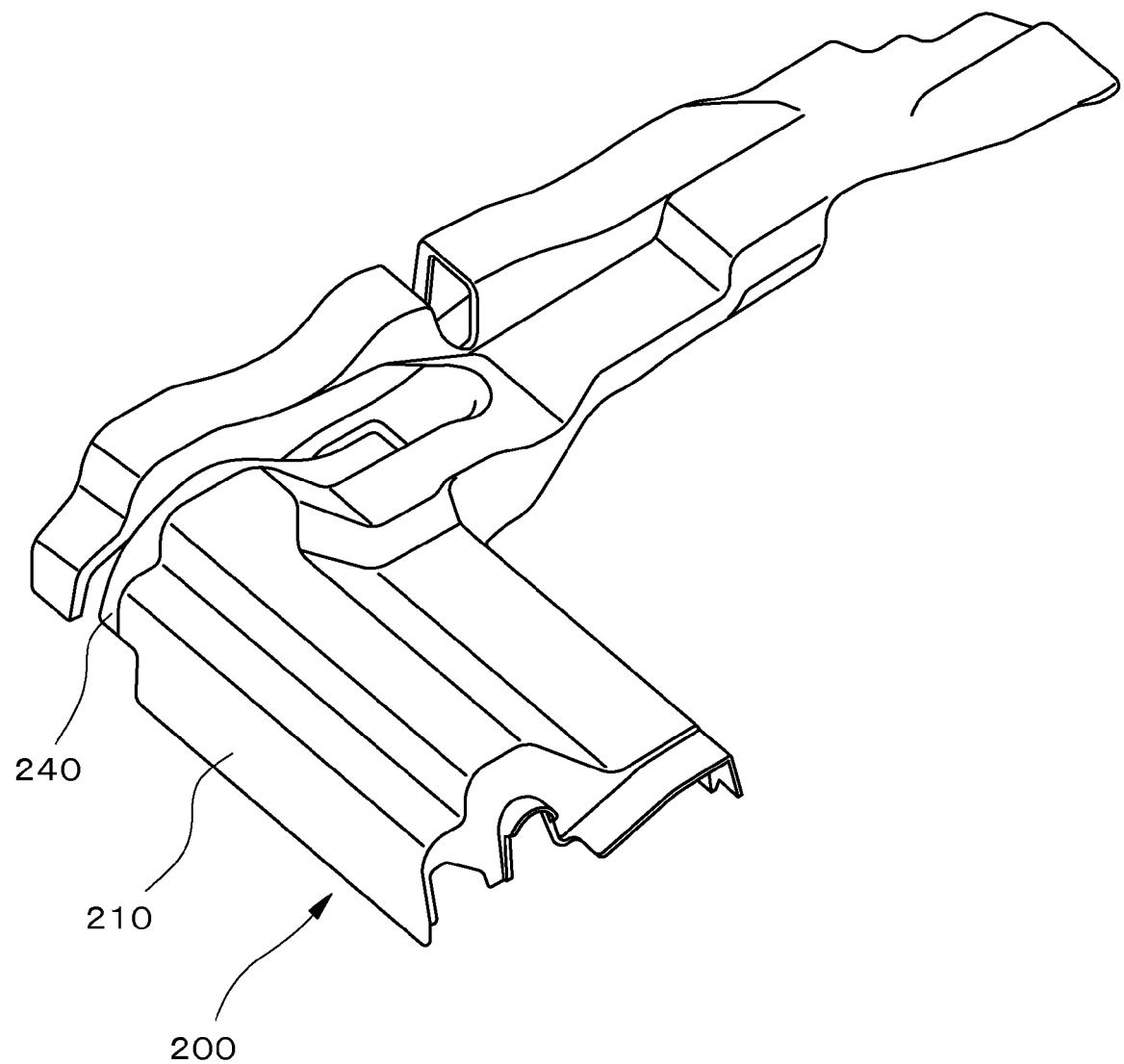
FIG. 27 is a schematic front perspective view illustrating a modified example of the cover 200.

Incidentally, as described above, a case is considered in which the movable member (specifically, the spiral spring cover member 220 and the link side cover member 230 described above) that moves along with the forward rotation of the link 121 is used as the portion (the biasing member cover portion) that covers the spiral spring 128 in the cover 200. However, the portion that covers the spiral spring 128 is not limited to the movable type, and may be an immovable type as long as the rotation of the link 121 is not disturbed. For example, as illustrated in FIG. 27, the cover 200 may be used in which a substantially rectangular cover rubber portion 240 formed by an elastic rubber is mounted to the upper position of the spiral spring 128 inside the slit which is formed to not disturb the rotation of the link 121 or the pipe rod 122 in the cover body 210.

More specifically, the cover rubber portion 240 covers the upper and front sides of the spiral spring 128 and approaches the movable range of the link 121. Accordingly, when the link 121 rotates forward, the link 121 contacts the cover rubber portion 240. Then, when the link 121 further rotates forward after contacting the cover rubber portion 240, the cover rubber portion 240 is elastically deformed to be turned up, and hence the link 121 may rotate without interfering with the cover rubber portion 240.

Furthermore, the cover 200 with the cover rubber portion 240 is formed in a manner that a portion corresponding to the cover rubber portion 240 is molded in advance, the portion is set on an injection molding machine (not illustrated) injecting a resin to mold the cover body 210, and the resin is injected to integrally mold the cover rubber portion 240 and the cover body 210.

TABLE OF REFERENCE NUMERALS 1 vehicle, 2 vehicle body floor, 3 luggage compartment part
10 seat cushion, 10a projection portion
11 cushion frame
20 seatback, 20a pedestal portion, 20b rotation shaft
21 seatback frame
22 pan frame
23 pipe frame
25 pillar inclination regulating portion
30 headrest
31 inner frame, 31a leg portion, 31b lower end flange portion
32 guide, 32a lower end flange
33 pillar
40 armrest
50 headrest rotation mechanism
51 casing
52 lock member
54 slide member, 54a one longitudinal end
60 seat cushion flip-up mechanism
70 seatback reclining mechanism
77 operation unit
80 arrangement unit
90 seatback supporting unit
100 striker lock mechanism
101 lock portion
102 lock piece
103 housing
104 connection piece
105 striker, 105a hook portion, 105b attachment portion
110 mounting unit
111 mounting plate
112 first plate portion (mounting member), 112a upright wall portion
112b slit, 112c path defining portion
112d mounting surface portion, 112e inclined surface portion
112f horizontal portion, 112g flange
112h attachment hole, 112i first apex 113, second plate portion (fixing member), 113a opening portion
213
113b, second apex, 113c boss-shaped portion
213b
213a extension portion
114 mounting hole (lock portion), 114a front end
114b intermediate portion, 114c rear end
115 submarine bracket, 115a upright portion
115b connection portion, 115c positioning hole
116 third plate portion
117 connection frame, 117a bottom surface, 117b side wall
117c bead, 117d groove
120 movable unit
121 link, 121a contact portion, 121b insertion hole
121c first bent portion, 121d second bent portion
121e reinforcement collar, 121f protrusion
122 pipe rod (guide member)
123 connection bar (connection member)
124 mounting bracket, 124a mounting surface portion, 124b side surface flange portion, 124c concave portion, 124d bent portion
125 support mechanism
126A, rotation shaft
126B
127 base bracket, 127a upright wall portion, 127b fixing portion
128 spiral spring
129 damper rubber
200 cover, 210 cover body
220 spiral spring cover member, 221 base portion, 221a shaft
222 main body portion, 222a bulging portion
223 cover mounting bracket, 224 spring
230 link side cover member, 230a, 230b side portion
231 notch, 232 peephole, 233 recess
240 cover rubber portion
Bo bolt (lock member), Ws washer (lock member), C cable
S1, vehicle seat
S11,
S12
ST1, stowing operation belt-shaped member
ST2
P1 intersection point, P2 center portion

The invention claimed is:

1. A vehicle seat flip-up mechanism that is capable of switching a posture of a seat cushion between a normal sitting posture and a stowed posture where the seat cushion is stowed while being inclined forward, the vehicle seat flip-up mechanism comprising:
a pair of links that is formed by elongated bodies extending in a front to back direction while being separated from each other in a seat width direction;
a pair of mounting brackets that is attached to ends of the pair of links and supports the seat cushion;
a connection member that is installed in the pair of mounting brackets;
a pair of support mechanisms that rotatably supports the pair of links; and
a mounting plate that is disposed below the pair of support mechanisms and is locked to a vehicle body floor,
wherein:
the mounting plate extends rearward relative to the links and comprises:
a fixing member that extends in the seat width direction; and
a mounting member that:
overlaps with one end of the fixing member;
is disposed along an extension direction of the link; and
comprises a mounting surface portion that contacts the vehicle body floor; and
an intersection point in a top view between the connection member and an imaginary line connecting an apex at an inside of a rear end of the mounting surface portion in the seat width direction and an apex not overlapping the mounting member in a rear end of the fixing member is disposed nearer an other end of the fixing member compared to a center portion of the connection member in an extension direction.

2. The vehicle seat flip-up mechanism according to claim 1, wherein one end of the mounting member is trapped between the fixing member and the vehicle body floor.

3. The vehicle seat flip-up mechanism according to claim 2, wherein:
at least one of the pair of support mechanisms includes a spiral spring that is attached onto the fixing member and biases the link; and
a portion overlapping the fixing member in the mounting member is disposed at an outside in the seat width direction relative to an attachment position of the spiral spring.

4. The vehicle seat flip-up mechanism according to claim 1, further comprising:
a guide member that is formed by an elongated body attached to at least one of the pair of mounting brackets and disposed in parallel to the link.

5. The vehicle seat flip-up mechanism according to claim 4, wherein when the seat cushion is held at the stowed posture, an end attached to the mounting bracket in the guide member is disposed at a lower side relative to the connection member.

6. The vehicle seat flip-up mechanism according to claim 4, wherein:
a rotation shaft is provided at a lower end of the link; and
the mounting bracket is attached to an upper end of the link and has a striker fixed thereto to regulate a flip-up operation of the seat cushion.

7. The vehicle seat flip-up mechanism according to claim 6, wherein the link and the guide member are attached to a part opposite to an attachment surface for the striker in the mounting bracket and are disposed at an inside in the seat width direction.

8. The vehicle seat flip-up mechanism according to claim 6, wherein:
the striker includes a hook portion which is bent in a horizontal direction; and
the hook portion is disposed between the end of the link attached to the mounting bracket and the end of the guide member attached to the mounting bracket.

9. The vehicle seat flip-up mechanism according to claim 1, wherein:
the pair of mounting brackets is attached to upper ends of the pair of links to support the seat cushion; and
the pair of links is formed so that a distance between the upper ends is larger than a distance between lower ends.

10. The vehicle seat flip-up mechanism according to claim 9, wherein:
the mounting plate includes a fixing member that is fixed to the vehicle body floor and extends in the seat width direction; and
a reinforcement collar is integrally formed with an outside of the lower end of the link in the seat width direction and a base bracket that is fixed to the fixing member is attached to an outside of the reinforcement collar in the seat width direction.

11. The vehicle seat flip-up mechanism according to claim 10, further comprising:
a guide member that is formed by an elongated body attached to at least one of the pair of mounting brackets and is substantially disposed in parallel to the link,
wherein:
the base bracket includes a fixing portion fixed to the fixing member and an upright wall portion bent from the fixing portion; and
the guide member is disposed at an inside of the upright wall portion in the seat width direction.

12. A vehicle seat comprising:
the vehicle seat flip-up mechanism according to claim 1; and
a cover member that covers the flip-up mechanism.

13. The vehicle seat according to claim 12, wherein:
a stowed position in which the seat cushion is held in the stowed posture is located at a front side relative to a sitting position in which the seat cushion is held at the sitting posture;
the flip-up mechanism includes a biasing member that biases the link and performs an operation of rotating the link forward by a biasing force of the biasing member as an operation of moving the seat cushion from the sitting position toward the stowed position; and
the cover member includes a biasing member cover portion that covers the biasing member.

14. The vehicle seat according to claim 13, wherein the biasing member cover portion is mounted to be rotatable forward along with a forward rotation of the link.

15. The vehicle seat according to claim 14, further comprising:
a biasing spring that biases the biasing member cover portion,
wherein:
the link contacts the biasing member cover portion during the forward rotation;
when a forward direction is set as a first direction and a rearward direction is set as a second direction in a rotation direction of the biasing member cover portion, the biasing spring biases the biasing member cover portion in the second direction; and
when the link further rotates forward while contacting the biasing member cover portion, the link presses the biasing member cover portion in the first direction to rotate the biasing member cover portion forward against a biasing force of the biasing spring.

16. A vehicle seat flip-up mechanism that is capable of switching a posture of a seat cushion between a normal sitting posture and a stowed posture where the seat cushion is stowed while being inclined forward, the vehicle seat flip-up mechanism comprising:
a pair of links that is formed by elongated bodies extending in a front to back direction while being separated from each other in a seat width direction;
a pair of mounting brackets that is attached to ends of the pair of links and supports the seat cushion;
a connection member that is installed in the pair of mounting brackets;
a pair of support mechanisms that rotatably supports the pair of links; and
a mounting plate that is disposed below the pair of support mechanisms and is locked to a vehicle body floor,
wherein:
the mounting plate extends rearward relative to the links and comprises:
a fixing member that extends in the seat width direction; and
a mounting member that:
overlaps with one end of the fixing member;
is disposed along an extension direction of the link; and
comprises a mounting surface portion that contacts the vehicle body floor;
the vehicle seat flip-up mechanism further comprising:
a guide member that is formed by an elongated body attached to at least one of the pair of mounting brackets and disposed in parallel to the link; and
wherein:
the mounting bracket comprises:
a seat cushion mounting surface portion to which the seat cushion is attached; and
a side surface flange portion which is formed to be bent from the seat cushion mounting surface portion, and
an end of the connection member and an end of the guide member are attached to the side surface flange portion and a concave portion is provided between a portion to which the end of the connection member is attached and a portion to which the end of the guide member is attached.

17. A vehicle seat flip-up mechanism that is capable of switching a posture of a seat cushion between a normal sitting posture and a stowed posture where the seat cushion is stowed while being inclined forward, the vehicle seat flip-up mechanism comprising:
a pair of links that is formed by elongated bodies extending in a front to back direction while being separated from each other in a seat width direction;
a pair of mounting brackets that is attached to ends of the pair of links and supports the seat cushion;
a connection member that is installed in the pair of mounting brackets;
a pair of support mechanisms that rotatably supports the pair of links; and
a mounting plate that is disposed below the pair of support mechanisms and is locked to a vehicle body floor,
wherein:
the mounting plate extends rearward relative to the links and comprises:
a fixing member that extends in the seat width direction; and
a mounting member that:
overlaps with one end of the fixing member;
is disposed along an extension direction of the link; and
comprises a mounting surface portion that contacts the vehicle body floor;
the pair of mounting brackets is attached to upper ends of the pair of links to support the seat cushion;
the pair of links is formed so that a distance between the upper ends is larger than a distance between lower ends;
an intermediate portion of the link in a longitudinal direction is provided with a bent portion which widens the distance between the upper ends of the pair of links;
the vehicle seat further includes a headrest; and
the pair of links is formed so that a distance between the upper ends is larger than a width of the headrest and a distance from the lower end to the bent portion is larger than a thickness of the headrest.

* * * * *